United States Patent
Canfield et al.

(10) Patent No.: US 10,701,266 B2
(45) Date of Patent: *Jun. 30, 2020

(54) METHOD FOR READING OUT CONTENTS OF A VIDEO FILE HAVING A PREDEFINED VIDEO FILE FORMAT

(71) Applicant: BioForce Analytics LLC, Exton, PA (US)

(72) Inventors: Eric L. Canfield, Downingtown, PA (US); Scott J. Soma, Media, PA (US); Brandon T. Fanti, Coatesville, PA (US); Vineeth Voruganti, Exton, PA (US); Daniel J. Gao, Downingtown, PA (US); Aron Sun, Exton, PA (US); Ryan M. LaRue, Coatesville, PA (US); Saahas S. Yechuri, Downingtown, PA (US)

(73) Assignee: BioForce Analytics LLC, Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,436

(22) Filed: Nov. 1, 2019

(65) Prior Publication Data
US 2020/0137307 A1  Apr. 30, 2020

Related U.S. Application Data

(63) Continuation of application No. 15/986,481, filed on May 22, 2018, now Pat. No. 10,469,750.

(51) Int. Cl.
*H04N 5/232*   (2006.01)
*H04N 5/14*    (2006.01)
(Continued)

(52) U.S. Cl.
CPC ........... *H04N 5/23258* (2013.01); *G06T 7/20* (2013.01); *H04N 5/05* (2013.01); *H04N 5/144* (2013.01)

(58) Field of Classification Search
CPC ...... H04N 5/23258; H04N 5/05; H04N 5/144; G06T 7/20
See application file for complete search history.

(56) References Cited

U.S. PATENT DOCUMENTS 9,579,541 B2 *   2/2017   Zhao .................. A63B 24/0021
9,620,168 B1 *   4/2017   Townsend ............ H04N 5/2628
(Continued)

OTHER PUBLICATIONS

Product description for "IMU Inertial Measurement Unit." Xsens North America Inc., printout from web page: <https://www.xsens.com/tags/imu/>Printout date: Aug. 17, 2018, original posting date: unknown.

(Continued)

*Primary Examiner* — Mishawn N. Hunter
(74) *Attorney, Agent, or Firm* — Panitch Schwarze Belisario & Nadel LLP

(57) ABSTRACT

A method is provided for reading out contents of a video file having a predefined video file format. The contents include video frames of an object in motion captured by a video recording device, and motion data of an object collected by an inertial measurement unit (IMU) that is attached to the object. The motion data is stored as metadata in one or more time intervals of the video file. Parsing instructions are stored in a computer memory. The parsing instructions indicate how the metadata is parsed into motion data for one or more video frames that are associated with the respective motion data. The contents of the video file are read out using the stored parsing instructions, thereby identifying specific video frames with their respective correlated motion data.

1 Claim, 14 Drawing Sheets

(51) Int. Cl.
*H04N 5/05* (2006.01)
*G06T 7/20* (2017.01)

(56) References Cited

U.S. PATENT DOCUMENTS

| | | |
|---|---|---|
| 9,880,441 B1 | 1/2018 | Osterhout |
| 2012/0044476 A1* | 2/2012 | Earhart ................. G01S 7/4814 356/4.01 |
| 2012/0086855 A1 | 4/2012 | Xu et al. |
| 2015/0201180 A1 | 7/2015 | Mourikis et al. |
| 2016/0116979 A1 | 4/2016 | Border |
| 2016/0322078 A1 | 11/2016 | Bose et al. |
| 2016/0327395 A1 | 11/2016 | Roumeliotis et al. |
| 2017/0053450 A1 | 2/2017 | Rodriguez et al. |
| 2019/0080700 A1 | 3/2019 | Schug et al. |

OTHER PUBLICATIONS

Product description for CamKix® Wireless Bluetooth Shutter Remote Control, printout from web page: <https://camkix.com/products/camkix-wireless-bluetooth-camera-shutter-remote-control-for-smartphones-create-amazing-photos-and-selfies-compatible-with-all-ios-and-android-devices-with-bluetooth-including-wrist-strap> Printout date: Aug. 20, 2018, original posting date: unknown.
Sofia Enamorado, "How to Create a SRT file." Printout from web page: <https://www.3playmedia.com/2017/03/08/create-srt-file/> Mar. 8, 2017, updated Jul. 5, 2018.
Wikipedia entry for "FFmpeg." Printout from web page<https://en.wikipedia.org/wiki/FFmpeg>Page last edited May 7, 2018, original posting date: unknown.
Wikipedia entry for "Inertial measurement unit." Printout from web page: <https://en.wikipedia.org/wiki/Inertial_measurement_unit>Page last edited Jul. 26, 2018, original posting date: unknown.

* cited by examiner

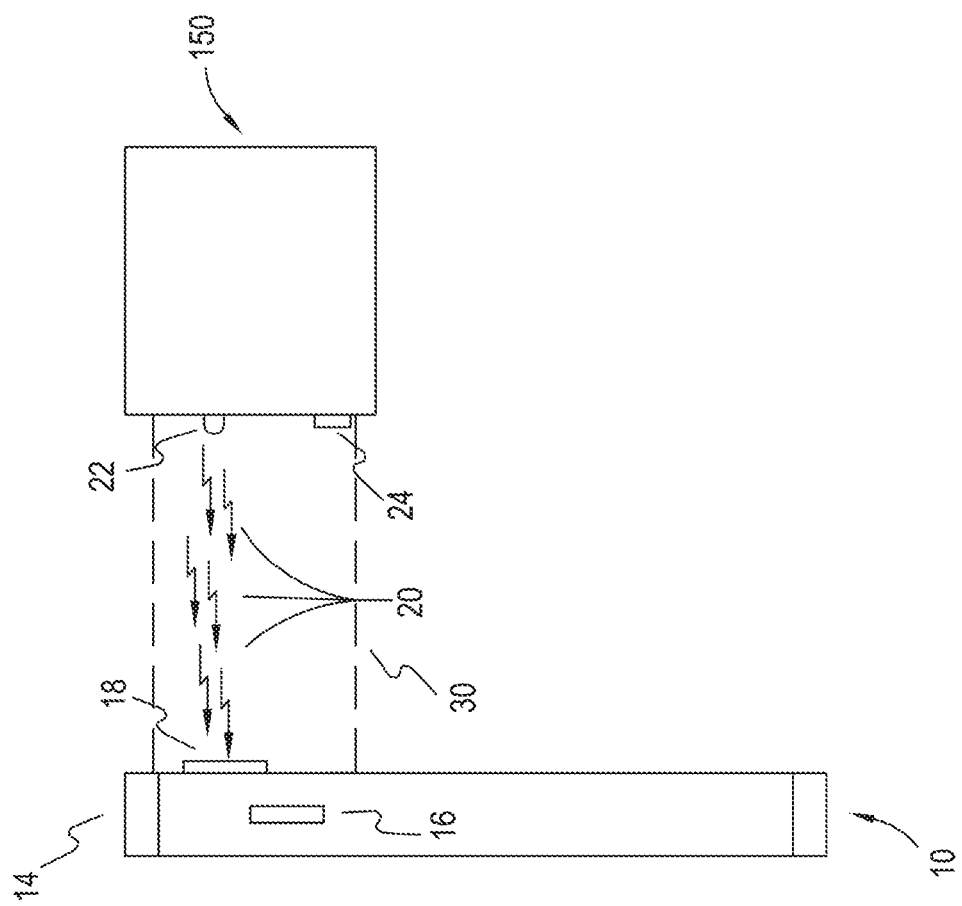

```
INT  AccelX,AccelY,AccelZ,GyroX,GyroY,GyroZ,MagX,MagY,MagZ
1    244,120,12488,4359,4983,6237,0,0,0,
2    160,64,12440,4368,4822,5960,
3    168,96,12464,4 393,4895,6374,
4    188,64,12536,4311,4904,6500,
5    264,12,12408,4391,4948,6325,
6    236,65520,12580,4428,5062,6176,
7    128,52,12468,4412,4746,6359,
8    204,76,12472,4448,4976,6492,
9    212,96,12428,4333,5464,6227,
10   192,128,12408,4333,5012,6134,
11   200,96,12428,4409,4756,6344,161,65205,65281,
12   204,36,12436,4407,5056,6240,
13   144,88,12484,4314,5050,6269,
14   132,44,12544,4389,4791,6002,
15   188,28,12468,4426,4821,6102,
16   192,116,12576,4387,4939,6278,
17   224,40,12432,4326,4788,6280,
18   172,104,12400,4336,4914,6215,
19   196,132,12524,4413,4818,6298,
20   160,28,12440,4301,4898,6340,
21   180,44,12384,4419,4654,6587,157,65195,65289,
22   204,52,12520,4305,5030,6336,
23   176,65504,12540,4409,4990,6260,
24   200,52,12452,4298,5047,6131,
25   196,40,12592,4463,4898,6481,
26   196,80,12456,4299,5125,6141,
27   188,65512,12452,4330,4885,5967,
28   172,28,12468,4368,5369,6195,
29   188,32,12440,4351,4924,6397,
30   136,65488,12400,4416,4873,6179,
31   128,20,12416,4373,4764,6012,165,65197,65289,
32   196,44,12540,4374,4616,6134,
33   212,40,12512,4438,4768,6409,
34   184,20,12428,4343,4904,6351,
35   192,76,12564,4356,4708,6135,
36   184,65520,12512,4370,4832,6297,
```

The value 244,120,12488,4359,4983,6237,0,0,0, on line 1 is marked with reference 900.

FIG. 12

METHOD FOR READING OUT CONTENTS OF A VIDEO FILE HAVING A PREDEFINED VIDEO FILE FORMAT

CROSS REFERENCE TO RELATED APPLICATION

This application is a continuation of copending U.S. application Ser. No. 15/986,481 filed May 22, 2018, the contents of which is incorporated by reference herein.

This application is related to U.S. application Ser. No. 15/986,391 filed May 22, 2018, now U.S. Pat. No. 10,284,752, entitled "Method for determining a start offset between a video recording device and an inertial measurement unit for use in synchronizing motion data of an object collected by the inertial measurement unit attached to the object with video frames captured by an image sensor of the video recording device of the object in motion."

BACKGROUND OF THE INVENTION

1. Field of the Invention

The technology herein relates to synchronizing the data collected by an inertial measurement unit with video recording device frames which recorded the motion.

2. Background

There are many instances where it is desirable to analyze data collected from an object in motion, such as data collected by an inertial measurement unit (hereafter, referred to as "motion data"), with the video recording of the object during its motion. For example, one display screen may simultaneously show the data on one part of the display screen and video frames of the video recording on another part of the display screen. Alternatively, the display screen may use picture-in-picture, overlaying, or other techniques to visually present both sets of information in a simultaneous manner. As the video frames are advanced, the corresponding data is simultaneously displayed. However, unless the motion data is almost perfectly synchronized with the video frames, the display screen would not be useful for analysis purposes because the wrong motion data would be displayed for the corresponding video frames. Likewise, any printouts of such data and video frames would not accurately reflect the actual motion data that was measured during the corresponding video frame of the object in motion.

In sophisticated laboratory settings, this type of synchronization can be accomplished using techniques similar to those used for generator locking or "genlock" where video output of one source, or a specific reference signal from a signal generator, is used to synchronize other picture sources together, thereby ensuring the coincidence of signals in time at a combining or switching point. Other types of master-slave arrangements are known in the art for tightly coordinating simultaneous data capture from two distinct devices. However, all of these arrangements require obtaining direct access to internal control functions of the respective devices.

There are many situations where it would be desirable to obtain a similar level of synchronization, but without needing to use expensive laboratory equipment, and without needing to take over control of internal processes of the video recording device. Consider, for example, a typical high school physics science experiment for testing the principle of conservation of energy wherein an object in motion is video recorded, and motion data is collected via an inexpensive inertial measurement unit (IMU) attached to the object. The student could then play back the video and simultaneously watch the corresponding motion data on a frame-by-frame basis, thereby dramatically enhancing the learning experience.

Video recording devices are ubiquitous today. In fact, virtually all high school students have mobile phones with built-in cameras that are capable of taking high quality video. However, it is not possible to obtain access to the internal control functions of a conventional mobile phone. Thus, if video is captured of the experiment by the mobile phone, there would be no easy way to synchronize the video file with the data file obtained from the IMU so that the video recording can start and stop with the motion data recording device in a synchronized manner.

Furthermore, even if the timing and start/stop relationship could be established for one particular mobile phone used by one student, the timing and start/stop relationship would not be useful for the mobile phones of the other students because different brands and models will perform differently. Even the exact same brand and model of mobile phone will not necessarily record video with the identical timing and start/stop relationship, due to differences in spare memory, the number of background apps being run, battery life, and the like.

Once a set of motion data and corresponding video file data is captured and saved as two sets of data files, it would be desirable to store (embed) the motion data in the video file using a conventional video file format that, upon playback, displays the video frames with properly synchronized motion data. However, unless the timing and start/stop relationship is properly established and stored in the video file, this goal cannot be achieved.

Accordingly, there is an unmet need in the art to provide an inexpensive, easy-to-use, method for synchronizing motion data with video that allows for a wide variety of video recording devices to be used, and without needing to take over control of internal processes of the devices, and for storing and playing back a video file that contains the motion data. The present invention fulfills such a need.

SUMMARY OF THE PRESENT INVENTION

A method is provided for embedding motion data of an object collected by an inertial measurement unit that is attached to the object into a video file that includes video frames of the object in motion captured by a video recording device. The video file has a predefined video file format that is configured to include metadata that is storable at predefined time intervals of the video file. The method operates as follows:

(a) Capture video frames of an object in motion and simultaneously collect motion data of the object.
(b) Store the captured video frames in the video file, and store the collected motion data.
(c) Convert the motion data to the metadata.
(d) Insert the metadata into one or more time intervals of the video file, wherein the metadata in each time interval includes the metadata for a plurality of successive or preceding video frames, thereby embedding the motion data of the object into the video file.

BRIEF DESCRIPTION OF THE DRAWINGS

Preferred embodiments of the present invention will now be described by way of example with reference to the accompanying drawings:

FIGS. 1A and 1B show an example calibration set-up which includes a mobile device (e.g., mobile phone), an Inertial Measurement Unit, a remote control, and an optional optical shield.

FIG. 12 shows an example comma-separated-value data dump of the first 36 intervals of 9-DOF data from an inertial measurement unit, by axis.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

Figure 1A:
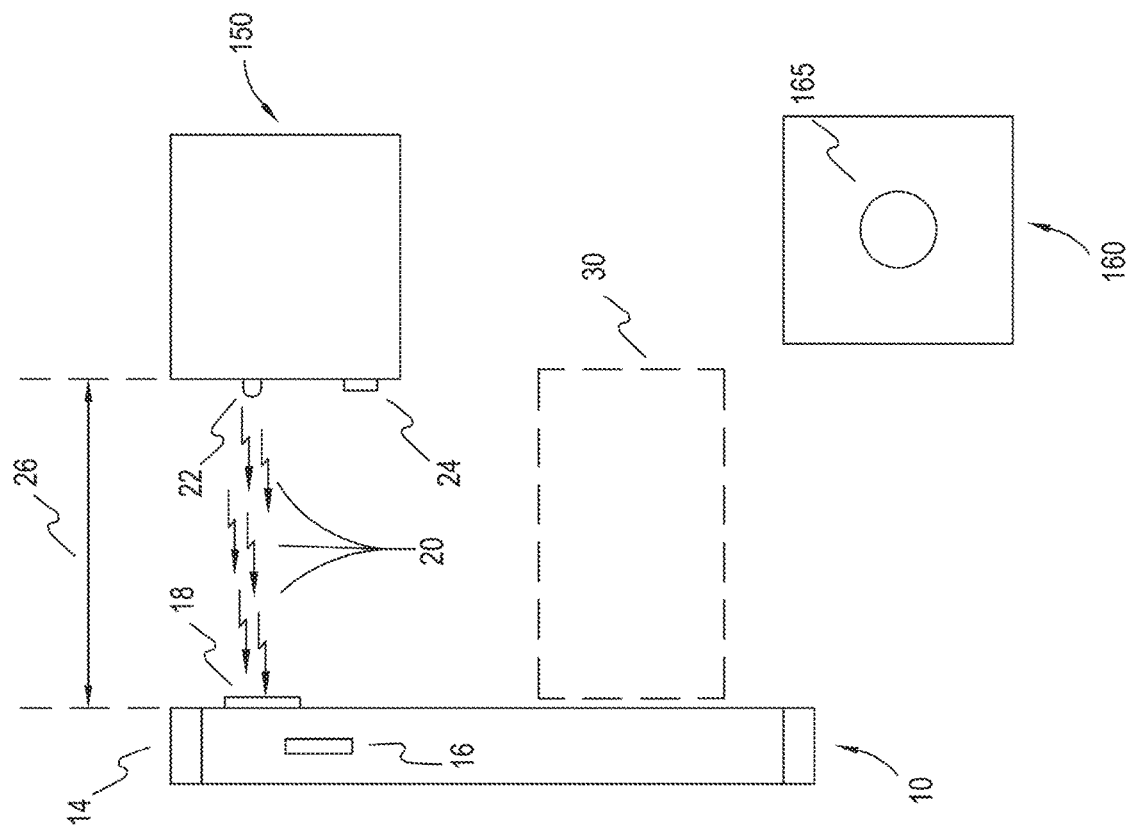
Figure 1A:
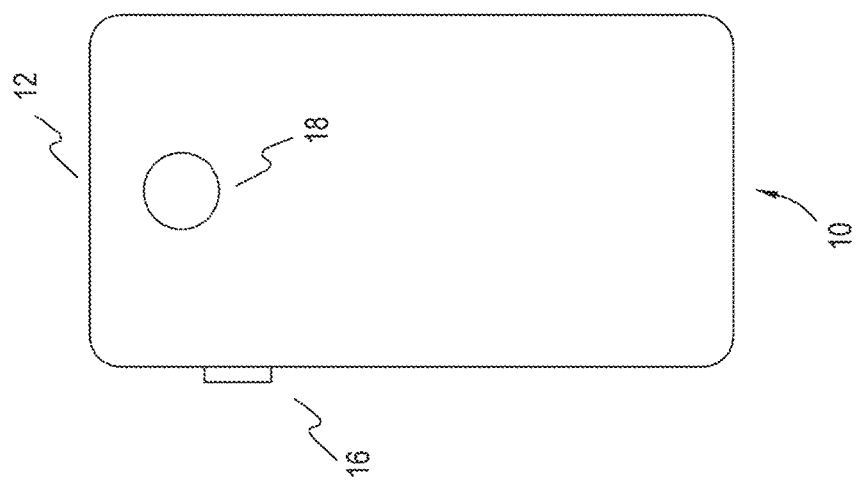
Figure 3:
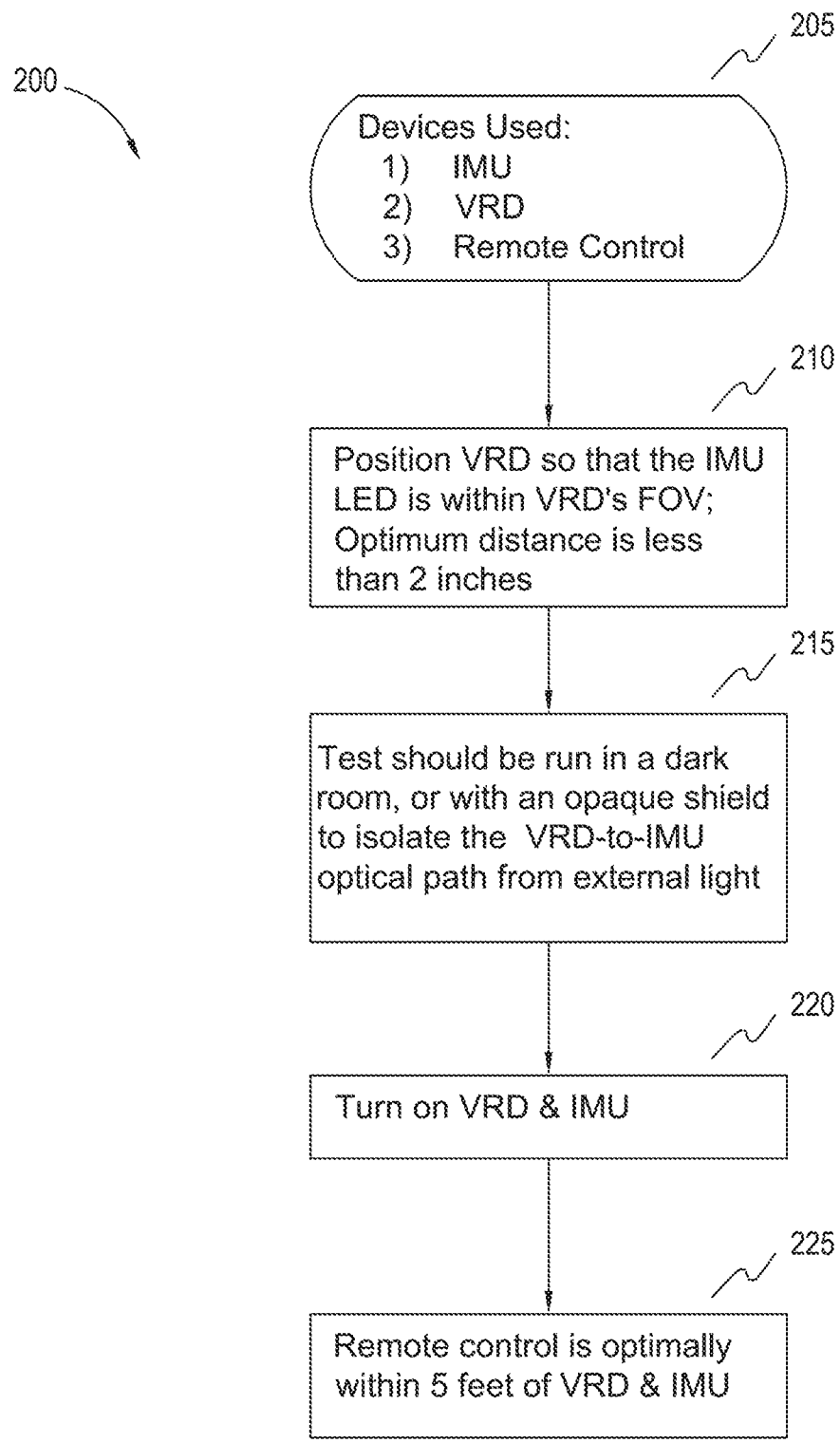
FIG. 3 shows an example calibration set-up flowchart of the exemplary motion data synchronization system.
Figure 4:
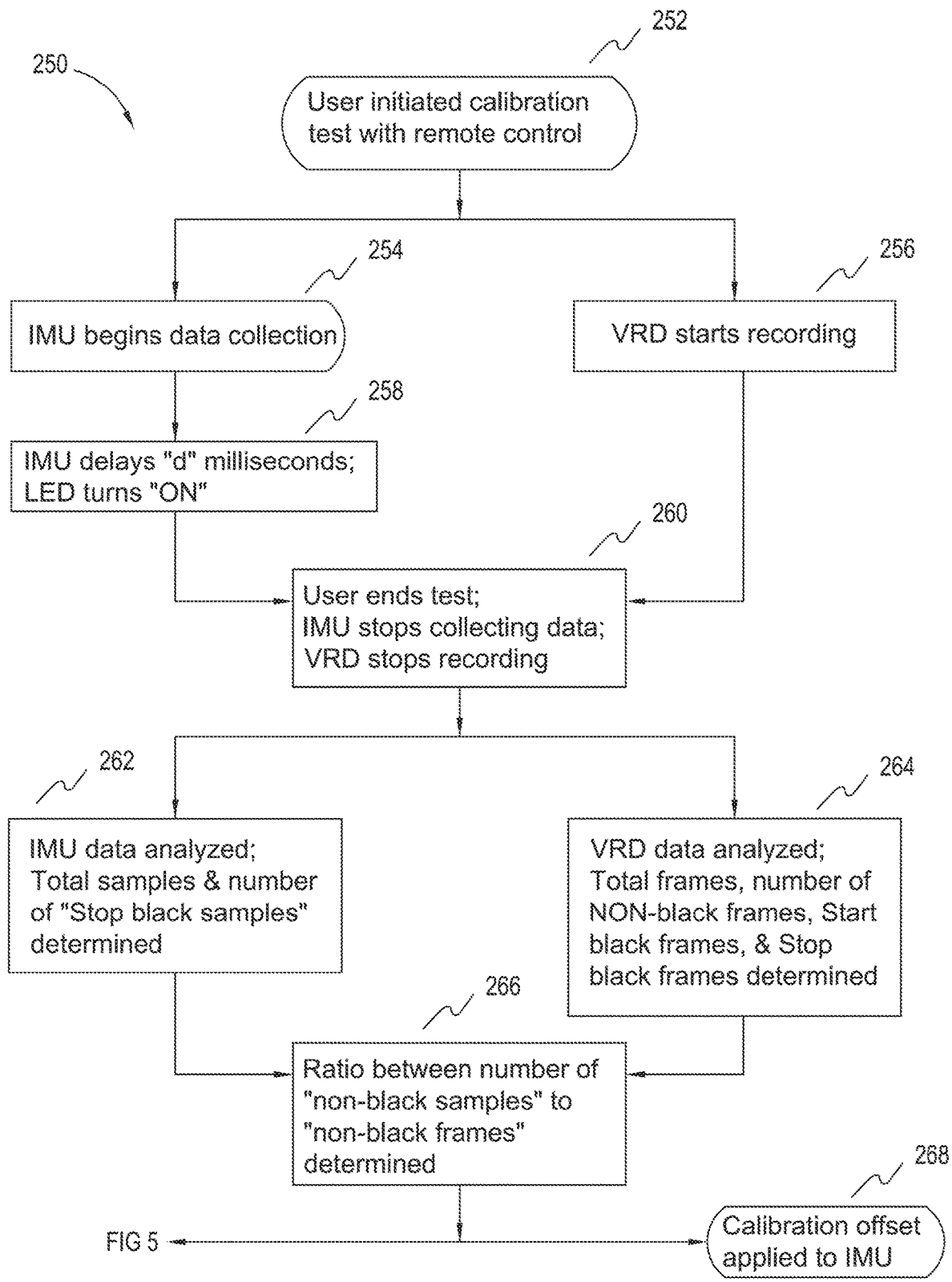
FIG. 4 shows an example calibration procedure flowchart of the exemplary motion data synchronization system.
Figure 7:
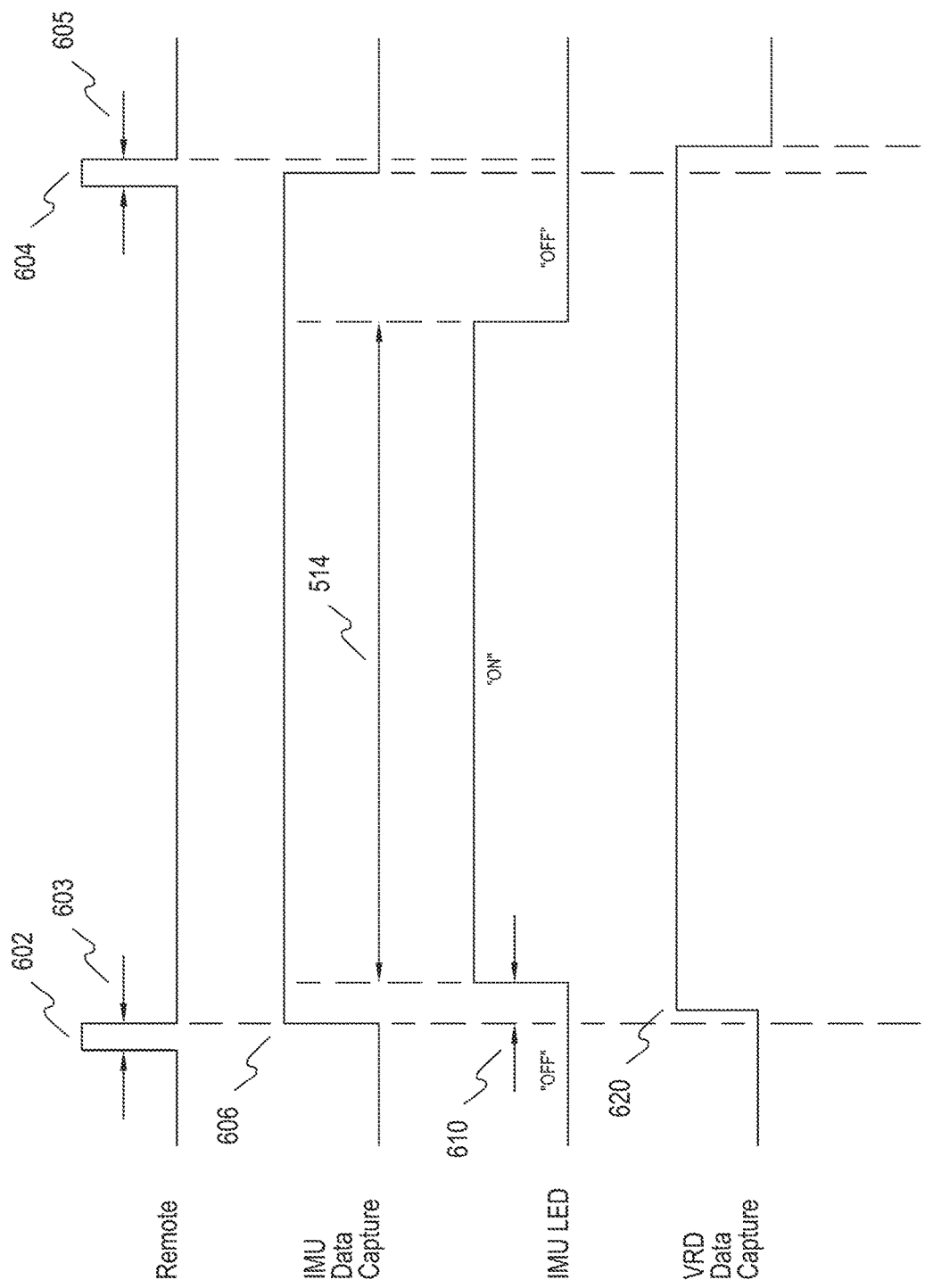
FIG. 7 shows a first example logic diagram for determining inertial measurement unit interval timing of the exemplary motion data synchronization system.
Figure 8:
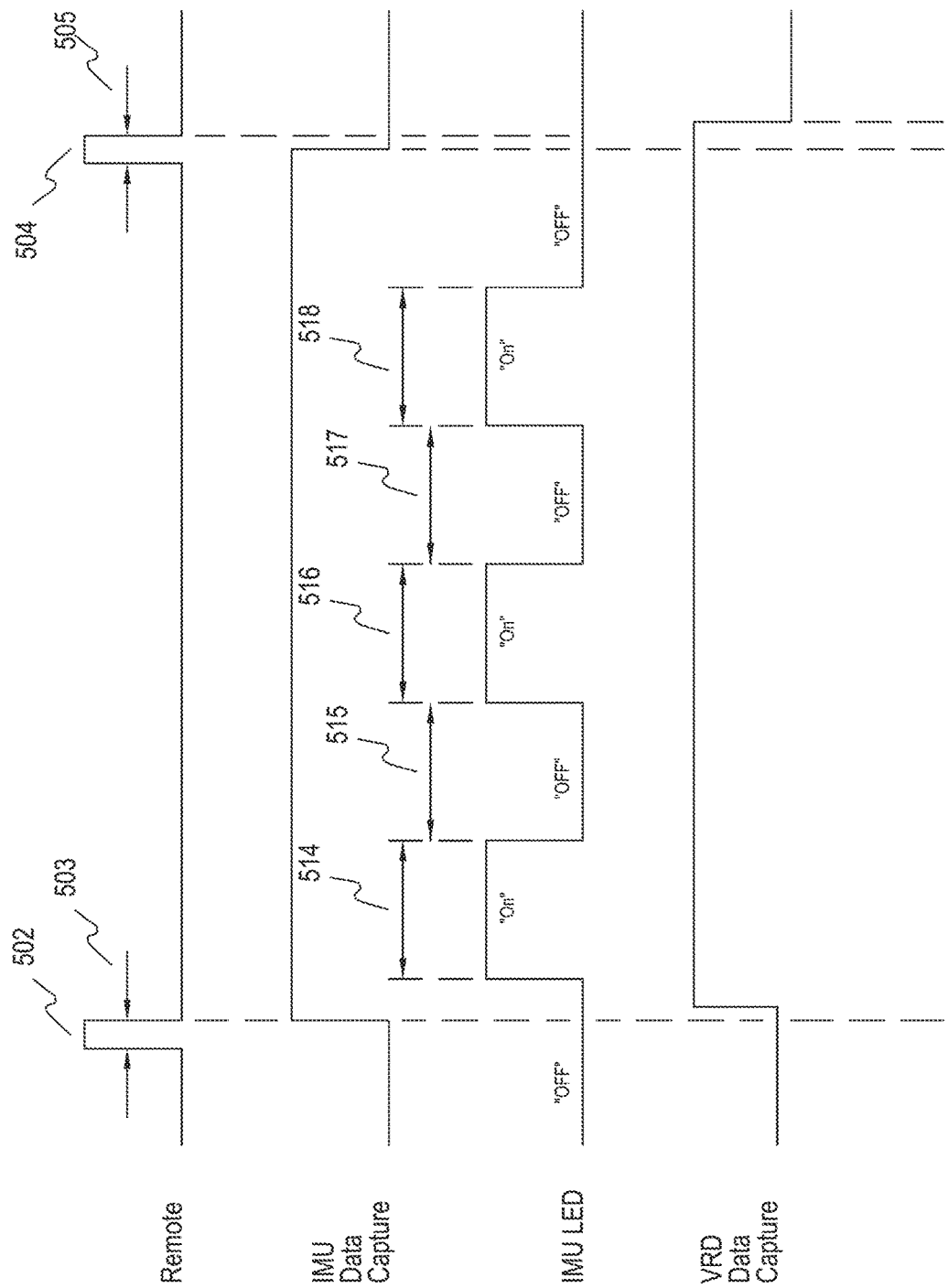
FIG. 8 shows a second example logic diagram for determining inertial measurement unit interval timing of the exemplary motion data synchronization system.
Figure 9:
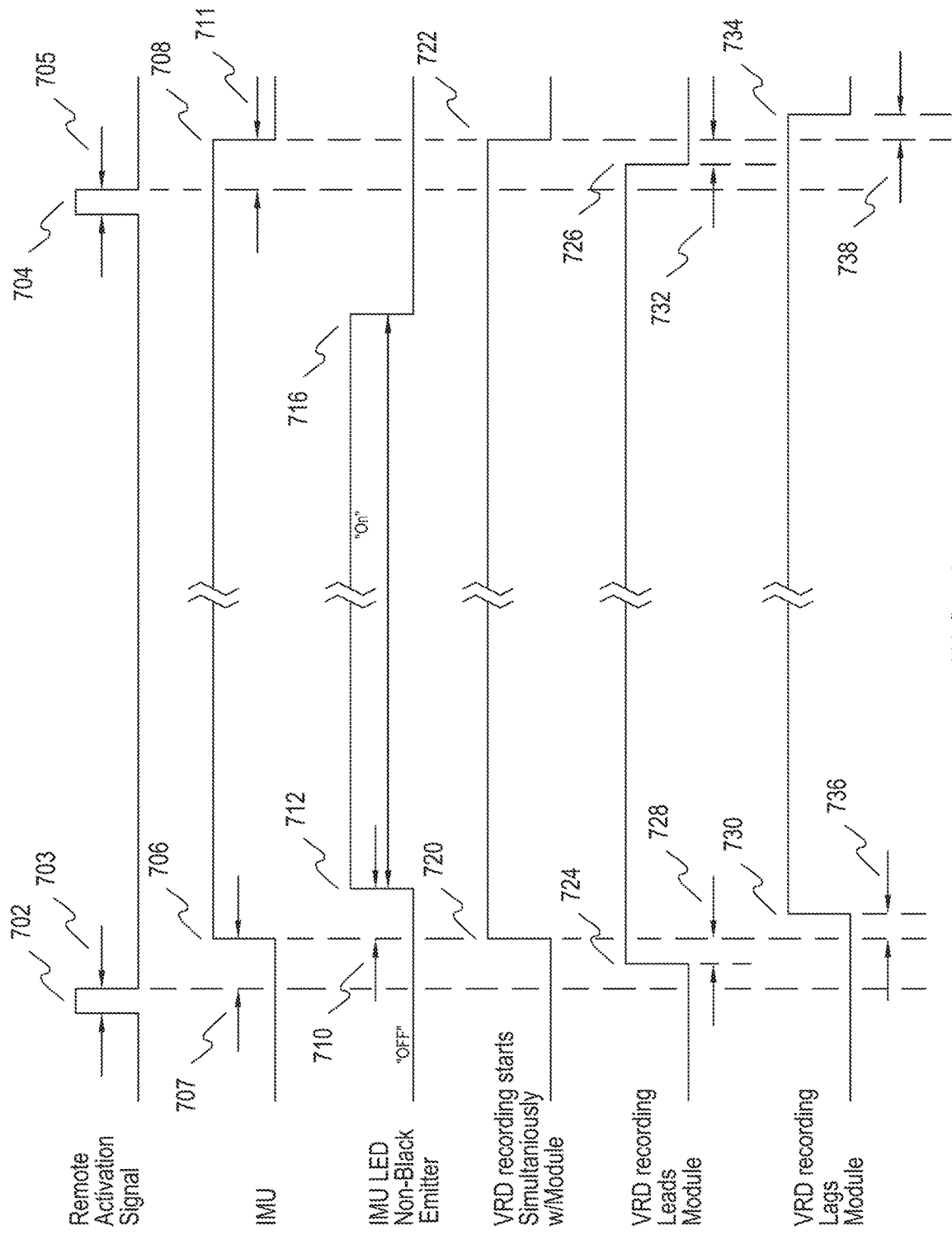
FIG. 9 shows an example logic diagram for determining start and stop latencies between the inertial measurement unit and video recording device of the exemplary motion data synchronization system.

The following definitions are provided to promote understanding of the present invention.

start offset—The start offset is the time difference between when a video recording device begins capturing video frames and an inertial measurement unit begins recording data after a signal is simultaneously sent to both devices to start their respective functions. The start offset is also referred to herein as an "interval timing offset ($T_{OFFSET}$)," "applied offset" and "calibration offset."

video recording device (VRD)—A video recording device is any device that captures video frames via an image sensor. Such devices include cameras of mobile devices (e.g., smart phones, cell phones), SLR cameras, GoPro® HERO® cameras, movie cameras, and vlogging cameras.

inertial measurement unit (IMU)—An IMU is an electronic device that measures and reports a body's specific force, angular rate, and sometimes the magnetic field surrounding the body, using a combination of accelerometers and gyroscopes, sometimes also magnetometers. An IMU may be described as a self-contained system that measures linear and angular motion, usually with a triad of gyroscopes and triad of accelerometers. An IMU can either be gimballed or strapdown, outputting the integrating quantities of angular velocity and acceleration in the sensor/body frame.

calibration state—A calibration state is a state that the IMU can be placed in that initiates a predetermined sequence of timed "on" and "off" states for a light source attached to the IMU. FIGS. 1A and 1B show a set-up used for the calibration state. FIGS. 3 and 4 show the steps of the calibration process, and FIGS. 7-9 show timing diagrams for the light source during the calibration process. The calibration state is not used during operation of the IMU for collection of data.

dark environment—A dark environment is an environment wherein in the absence of intentionally added light, a video frame captured in the environment will appear black, and in the presence of a significant quantity of intentionally added light from a light source, a video frame captured in the environment will appear non-black. The dark environment does not necessarily need to be completely dark to perform the calibration process, as discussed below with respect to capabilities of black frame analysis in programs such as FFmpeg.

black/non-black analysis of video frames—This analysis is equivalent to conventional black frame detection. Based on this detection, a frame is either black or non-black. In the dark environment, the video frames are black when the light source is "off" and the video frames are non-black when the light source is "on.

calibration stop time event—The calibration stop time event determines the point in time where information collected during the calibration process is used to determine the start offset. Any information collected after the calibration stop time event is not used to determine the start offset. In one preferred embodiment, the calibration stop time event occurs upon detection by the IMU of a "stop command" by the remote control device. In another preferred embodiment, a user selects a point in time during the information collection and designates that point in time as being the calibration stop time event. This point in time should be selected so that sufficient information is available prior to this point in time to perform an accurate start offset determination.

metadata—Metadata is a set of data that describes and gives information about other data. Metadata is interchangeably referred to herein as "string data."

video file format—A video has a predefined video file format, also known in the art as a "video container format." MPEG-4 Part 14 or "MP4" is the most commonly used video file format. Video file formats, such as MP4 files, may contain metadata as defined by the format standard. For example, MP4 metadata may contain various details about the file author, the software used in its creation, and the time and date in which it was created. MP4 files may also contain Extensible Metadata Platform (XMP) metadata. The part of the video file that stores the metadata may also be referred to as a "video codec subtitle partition."

II. Detailed Disclosure

FIG. 1A shows remote control 160, which is preferably a handheld device. Remote control 160 communicates with both IMU 150 and VRD 10. The IMU 150 and VRD 10 may use the same or different remote control methods and protocols. For example, the VRD 10 may be an Apple® iPhone® 6s where the desired remote control for starting and stopping the video is a Bluetooth® shutter control device, such as the commercially available CamKix® Wireless Bluetooth Shutter Remote Control, which is compatible with iPhones and Androids. (CamKix is a trademark of OEM Tech Bargains LLC located in Billings, Mont.)

The IMU remote control uses a On-Off-Keying (OOK) protocol operating on the 433 MHz band, which is a simple amplitude-shift keying (ASK) modulation, wherein the presence or absence of a carrier wave represents binary digital data. The binary symbol 1 is represented by transmitting a fixed-amplitude carrier wave and fixed frequency for a bit duration of T seconds. If the signal value is 1 then the carrier signal will be transmitted. Otherwise, a signal value of 0 will be transmitted.

Regardless of whether the IMU 150 and VRD 10 remote control methods are the same or different, the remote control 160 is configured to operate both.

The remote control 160 may have one or more pushbutton 165, but for simplicity, only one pushbutton 165 is shown in FIG. 1A. In this example, the IMU 150 and VRD 10 use different remote control frequencies and protocols and remote control 160 is configured to communicate with both. When pushbutton 165 is pressed, simultaneous wireless signals are sent to the IMU 150 and VRD 10 in the form of a start command that includes one or more start signals. The independent communications and operations of IMU 150 and VRD 10 result in different operating system delays and processing and different interval timing for collecting IMU 150 motion data and VRD 10 video. Also, start and stop latencies between the IMU 150 and VRD 10 are not the same relative to the transmission, reception, and processing of remote control 160 signals. All of these factors result in the inability of the IMU 150 and VRD 10 to be synchronized with respect to their respective collected data and recorded video. The unsynchronized nature of the IMU 150 motion data and the VRD 10 recorded video is the problem solved by the present invention when the IMU 150 is attached to the object in motion which the VRD 10 is recording. In order to synchronize the IMU 150 motion data file with the video file of the VRD 10 so as to view them simultaneously side-by-side, picture-in-picture, overlaid, or otherwise, the relationship between the timing of the individual devices must be synchronized and both files must be able to start and stop in a synchronized fashion. Further, if it desired to embed the IMU 150 motion data within the video file recorded by VRD 10, the timing and start/stop relationship must also first be established.

As explained above, separate devices IMU 150 and VRD 10 essentially start and stop data collection and recording video, respectively, unsynchronized one to the other, even though the remote control 160 simultaneously communicates the "start" and "stop" commands. Understanding the reasons which complicate and mitigate the synchronization of two or more separate devices using unique operating systems and remote control methods helps to explain the herein described inventive solutions for solving the synchronization problem.

A typical mobile device, such as a cell phone, is essentially a standalone handheld computer. It has its own operating system and software-driven priorities over which the user has no absolute control. While the user may enable and enjoy hands-free Bluetooth pairing to headsets, Wi-Fi connection to wireless routers, data connections facilitated by the wireless carrier, and even SMS text messages, the timing, connection, and prioritization of those external capabilities and communications is all controlled by the cell phone's operating system. Cell phones nowadays also contain numerous apps, both user-optional and operating system-specific. Apps running in the foreground and background operate at various priority levels, most of which are not user-controlled. Provider network updates, GPS tracking, 911 priority, and a myriad of other tasks are all running whenever the cell phone is turned "ON," invisible to the user. The operating systems and methods vary between manufacturers and service providers, as does the hierarchy and priority settings of the various tasks. It should be clear to the reader that some cell phone-specific tasks will have inherent delays, over which the cell phone user has no control.

The most common remote control method for controlling the camera on a cell phone, whether it is an iPhone, Android, or any other operating system or manufacturer, is to use a Bluetooth-paired remote control, such as the CamKix Wireless Bluetooth Shutter Remote Control discussed above. Because virtually all cell phones can take a photograph or video by pressing a volume control pushbutton, Bluetooth remote-controls are designed to easily pair within seconds to virtually any cell phone and, when paired, will simulate the pressing of the volume control pushbutton, without the user loading an app to facilitate operation. Depending upon the type of remote control used, the camera shutter will respond to either the initial press of the remote control pushbutton or when the user releases the remote control pushbutton. If the cell phone camera shutter response occurs upon release of the remote control, the actual response of the cell phone relative to the remote control is therefore partially user-dependent. The user-induced variable delay becomes a factor when designing a universal remote control, such as the remote control 160, because, as discussed above, the response of the cell phone shutter to a given remote control can occur during the initial press of the remote-control pushbutton or upon release.

Many other types of VRD's work in a similar fashion. For example, GoPro cameras use an ad hoc Wi-Fi methodology where the camera is the host, or access point, and the remote control is the connected node, or satellite. Similar to the cell phone remote control method, GoPro shutters respond when the remote control pushbutton is released. Most other VRD's operate in a similar fashion, either when the remote control pushbutton is pressed or upon release.

In most practical applications and uses of the exemplary motion data synchronization system, the user holding the remote control 160 will be closer to, if not actually using, the VRD 10 to video record the object in motion to which IMU 150 is attached, suggesting that the physical proximity of the IMU 150 will be at some distance. A wireless communications method that allows for a more predictable and repeatable response time between the remote control 160 and IMU 150 over a greater distance that a typical VRD's Wi-Fi or Bluetooth remote control method will substantially reduce the start and stop latency with respect to the two devices, while ensuring that the start and stop latency variations are also consistent. For example, the previously mentioned OOK method, operating at 9600 baud at 433 MHz, and sending a simple repeated recognition byte by the remote control 160, results in very repeatable IMU 150 start and stop latencies, relative to the beginning of the remote control 160 transmission, while achieving substantial reliability and signal integrity at a much greater range or distance than that of a typical Wi-Fi or Bluetooth communications method.

Figure 10A:
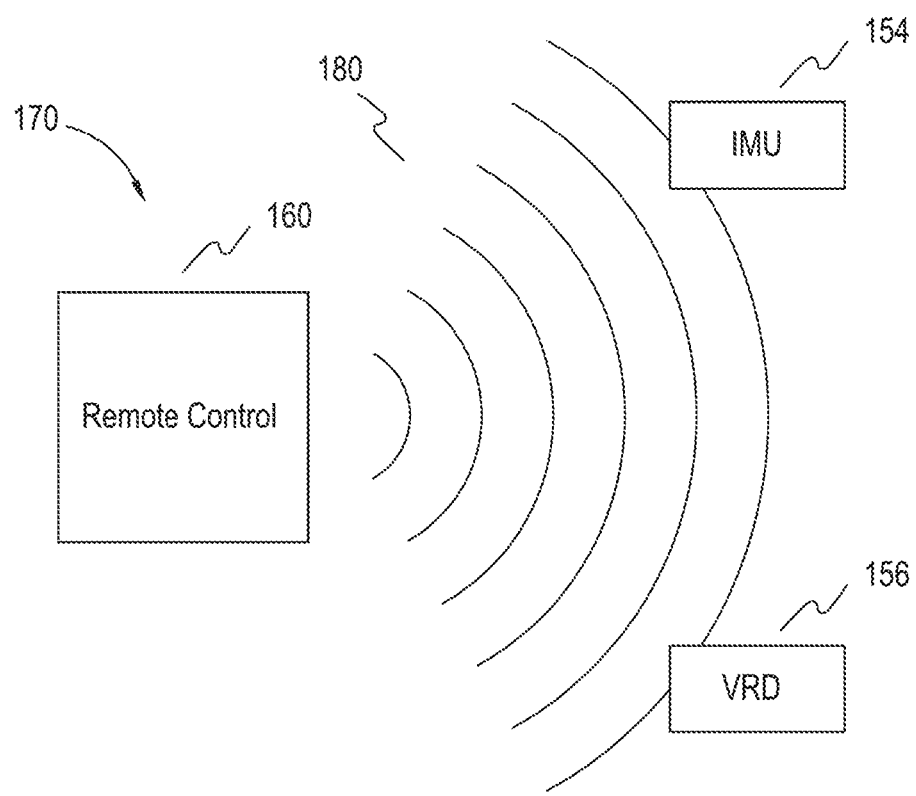
FIG. 10A shows an example remote control controlling a single inertial measurement unit and a single video recording device
Figure 10B:
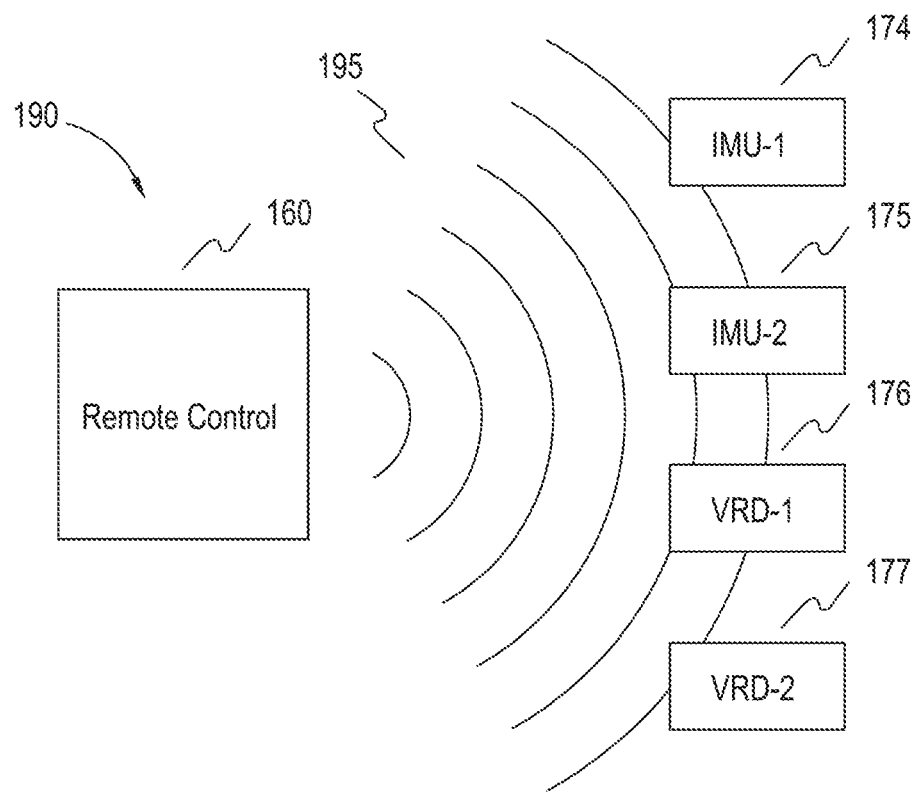
FIG. 10B shows an example remote control controlling one or more inertial measurement units and one or more video recording devices.

A typical application of a VRD recording video of an IMU is shown in FIGS. 10A and 10B. Referring to FIG. 10A, system 170 shows the remote control 160, the IMU 154, and the VRD 156. In this example, the remote control 160 communicates with the IMU 154, which upon receiving the start command, begins to collect 9-degree of freedom (9-DOF) data at 240 samples-per-second (hereafter "sps"). The VRD 156, upon receiving the start command, begins to record video at 240 frames-per-second (hereafter, "fps"). In this example, both the VRD 156 and IMU 154 are operating in an unsynchronized manner. If a precisely synchronized 60 second test is run, the result would ideally produce 14,400 9-DOF data samples, 14,400 video frames, and the data samples would perfectly match the corresponding video frames. But in this example, the two devices have not been synchronized and the crystal-controlled clock oscillator of the IMU 154 is producing a data sample rate 0.2% faster than the video frame rate of the VRD 156, which contains its own crystal-controlled clock oscillator, resulting in 14,429 total 9-DOF data samples, or an additional 29 samples of data as compared to the number of video frames. Further, in this example, IMU 154 began collecting data 460 milliseconds before VRD 156 began to record video, meaning that 110 9-DOF data samples were collected prior to the first video frame being recorded. It is obvious that the resulting data and files are not synchronized and aligned and the overall timing differential between the independent IMU 154 and VRD 156 crystal-controlled clock oscillators is also producing an increasing offset between data samples and video frames.

FIG. 10B is similar to FIG. 10A, except that the remote control 160 controls a plurality of IMU's (here, IMU-1 174 and IMU-2 175) and VRDs (here, VRD-1 176 and VRD-2 177). Here, the IMU-1 174 and VRD-1 176 are used together, and the IMU-2 175 and VRD-2 177 are used together. That is, the VRD-1 176 captures video frames of an object in motion having the IMU-1 174 attached thereto, and the VRD-2 177 captures video frames of an object in motion having the IMU-1 175 attached thereto.

III. Inertial Measurement Unit (IMU)

Figure 2:
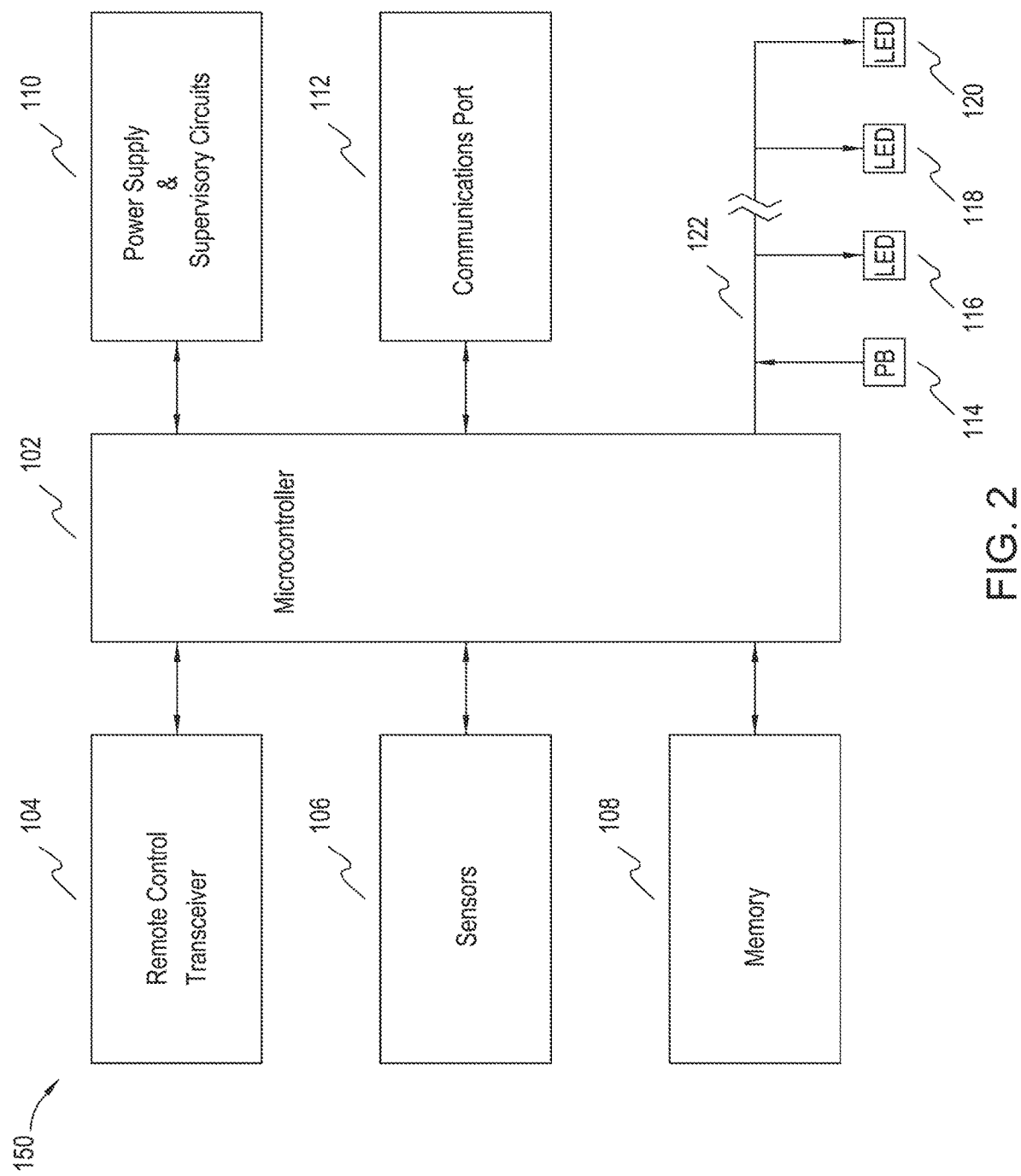
FIG. 2 shows an example inertial measurement unit circuit.

FIG. 2 shows an exemplary IMU. The IMU 150 is completely self-contained and includes microcontroller 102, remote control 104, sensors 106, memory 108, power supply 110, communications port 112, and user interface bus 122. The microcontroller 102 can be any high-speed crystal-controlled microcontroller, preferably with onboard volatile RAM and non-volatile EEPROM memory storage, such as any device from the Microchip® PIC18F family of microcontrollers, commercially available from Microchip Technology Inc. located in Chandler, Ariz. The remote control 104 can be any of several types of radio frequency receivers or transceivers, including, but not limited to, Bluetooth, Wi-Fi, VHF, UHF, and the like. The sensors 106 can be a single or multiple sensor configuration which includes, but is not limited to, acceleration, gyroscopic, magnetometer, vibration, temperature, humidity, pressure, and the like. The sensors 106 can also be single or multiple axis. For example, the sensor 106 could be a single sensor containing three-axes of acceleration, gyroscopic, and magnetometer, also known as 9-DOF, or nine-degrees-of-freedom. The power supply 110 can be a multi-parameter circuit containing a voltage regulator, onboard battery or supercapacitor, battery or supercapacitor recharging circuit, microcontroller supervisory circuits, and input circuitry for receiving and processing externally supplied power to the IMU 150. The communications port 112 connects any external device or cable to the microcontroller 102, and it is the conduit through which programming and data flow bidirectionally. The user interface bus 122 can include, but is not limited to, pushbuttons (e.g., pushbutton 114), LED's (e.g., LEDs 116, 118 and 120), proximity sensors, ambient light and infrared sensors, and the like. When the IMU 150 is powered up, the microcontroller 102 waits for a command from either the communications port 112 or the remote control 104. Commands, include, but are not limited to, calibration, upload or download data, set operational parameters, begin collecting data, stop collecting data, and the like. For example, if the remote control 104 sends the command to begin collecting data, the microcontroller 102 will communicate with the sensors 106 and begin polling data at the rate specified in the predetermined and stored operational parameters, and then store the collected data in the memory 108 or in the memory of the microcontroller 102. If the microcontroller 102 receives the command to upload data, the microcontroller 102 will access the memory locations in which the collected data was stored, and upload via the remote control 104 or the communications port 112. All of the aforementioned basic IMU 150 operations just described are well-known to those who utilize motion data collection devices.

IV. Video Recording Device (VRD)

FIG. 1A shows cell phone 10 as a typical VRD. However, the VRD can be any device with video recording capabilities wherein the video recording process can be started and stopped remotely. Remote control of the VRD's can be via Wi-Fi, Bluetooth, or any other radio frequency or infrared method designed in by the VRD manufacturer. VRD's can be typical cell phones, including but not limited to iPhones and Android-based devices. VRD's can also include, but are not limited to, GoPro cameras or similar, tablets, laptops, or 35 mm SLR camera with video recording capabilities, and the like.

V. Overview of the Calibration and Synchronization Process and Method of the IMU and VRD The inventive approach to motion data synchronization does not involve modifying the VRD or its operating software, although both are certainly possible. The preferred calibration method involves controlling the ON/OFF illumination of one or more of the LEDs 116, 118, 120 of the IMU 150 in a predetermined sequence of intervals in order to produce a combination of non-black frames and black frames within the field of view of the VRD 10, preferably in a dark environment or with an optical shield which restricts the field of view of the VRD 10 so as to recognize the LED(s) of the IMU 150 as the only ambient light source. The resulting known and calculated IMU 150 motion data sample parameters in view of the LED ON/OFF sequence and the known and calculated resulting black and non-black frames within the video frames are then used to adjust the IMU 150 interval timing in order to synchronize it to the VRD 10 fps or a ratio thereof, and to establish start and stop latency differentials between the IMU 150 and VRD 10. The adjusted IMU 150 interval timing synchronizes the desired sample rate with the VRD 10 video frame recording rate, with the latency differentials being applied to achieve start synchronizations of both files. Although 240 sps and 240 fps were used in a previous example, the IMU sample rate and VRD frame rate do not have to be the same, as will be explained below.

VI. Calibration Setup and Method

FIG. 1A shows an example calibration set-up which includes the VRD 10 (in the form factor of a conventional cell phone), the IMU 150, the remote control 160, and an optional optical shield 30. The VRD 10 is shown in a rearward-facing orientation 12 to clearly show its camera lens 18 and side-view orientation 14. FIG. 3 shows calibration flowchart 200 which details the physical calibration set-up process. Block 205 of FIG. 3 identifies the minimal necessary materials required to perform the calibration, namely, the IMU 150, the VRD 10 and the remote control 160. Block 210 of FIG. 3 describes positioning LED 22 of the IMU 150 so that it is within the field of view of the VRD 10. A "camera lens-to-LED" distance, labeled as 26, is optimally less than 2 inches and can be accomplished by simply facing the devices towards one another. Block 215 of FIG. 3 directs that the test be run in a dark room or that optional optical shield 30, which can be a simple cardboard tube, be placed between the IMU 150 and VRD 10 to block out external light. A sample configuration of the cardboard tube configuration is shown in FIG. 1B. While the terms "black" and "non-black" are used with respect to the LED 22 and the VRD 10 image resolution of the same, any reasonable level of contrast which occurs when the LED 22 turns ON and OFF can be distinguished during the processing of the resulting video file. Block 220 of FIG. 3 instructs the user to turn on the VRD 10 and IMU 150. Block 225 of FIG. 3 instructs the user to make sure that the remote control 160 is optimally used within 5 feet of the VRD 10 and IMU 150.

VII. Synchronizing the Inertial Measurement Unit Interval Timing with a Video Recording Device FIG. 4 shows an example calibration procedure flowchart 250. FIG. 4 should be read in conjunction with the timing diagrams of FIG. 7. Although not shown in any drawing, the duration of the calibration process has been pre-specified for the user. For instance, the user is instructed to begin the test using the remote control 160 and to wait approximately 3 minutes and 15 seconds before terminating the test by once again pressing the pushbutton 165 on the remote control 160, thereby causing a stop command to be sent out. It should be understood that the VRD 10 will initially record black frames, then record non-black frames, and finally conclude with recording additional black frames, because the user has been instructed to observe a test duration that exceeds the actual calibration sequence duration, as will be explained in detail below. Further, although in this example it is understood that the user will start and stop the calibration procedure, a further embodiment is that the user would start the calibration procedure by pressing the pushbutton 165, and the remote control 160 would automatically send the stop commands after a precisely timed duration.

Block 252 instructs the user to start the calibration by pressing the pushbutton 165 on remote control 160, which is shown in an example timing diagram of FIG. 7 as being remote control receiver pulse 602 having a variable duration 603 milliseconds (e.g., 650 milliseconds) which corresponds to the amount of time the user presses and then releases pushbutton 165.

Block 254 indicates that the IMU 150 begins to immediately start collecting data in response to receiving the remote control receiver pulse 602, as represented by rising edge 606, at which time the LED 22 has not yet been illuminated. For explanatory purposes, the term "collecting data" always also implies that data sample intervals are being incremented and counted, since no actual motion data is being collected during calibration. All timing diagrams herein can be considered in terms of either time durations, video frames, or sample intervals.

Block 256 shows that the VRD 10 has also begun to record video frames in response to receiving the remote control receiver pulse 602, as represented by rising edge 620. In this example, the rising edge 620 occurs after the IMU 150 has begun to collect data, which may not always be the case.

Block 258 shows that the IMU 150 delays "d" seconds or intervals after rising edge 606 has occurred, which corresponds to delay 610 and is later mathematically identified as "Number of Starting Black Samples", or IMUBSSTART, after which the LED 22 of the IMU 150 is illuminated.

The LED 22 remains illuminated for a predetermined number of intervals, as shown by duration 514, which is mathematically defined as "Number of Non-Black Samples", or IMUnBS, and is then extinguished. In FIG. 7, the IMU 150 and VRD 10 are still collecting data and recording video, respectively, when the LED 22 is extinguished.

Block 260 shows the user stopping the calibration procedure by pressing the pushbutton 165 on the remote control 160, as indicated by remote control receiver pulse 604 having a user-determined duration 605, preferably after observing the proper time duration when stopped manually. The IMU 150 and VRD 10 respond to the remote control receiver pulse 604 by terminating data collection and video recording, respectively.

Block 262 analyzes IMU 150's calibration data file by converting the data into a simple CSV (Comma-Separated-Value) format and simply reading the number of rows of data, and the results are then combined with the predetermined known data, yielding the following:

A. Predetermined known data includes:
   i. Interval Timing ($T_{INT}$) in seconds or clock cycles. This term relates specifically to the interrupt timer setting in the microcontroller 102 during calibration. For example, if microcontroller crystal-controlled clock is 8 MHz with a clock cycle time of 250 nanoseconds and 240 sps is desired, $T_{INT}$ is preset to approximately 16,667 clock cycles. It is understood that any fixed microcontroller execution time associated with processing the interval timing routines would be subtracted from the calculated result.
   ii. Sample-Per-Second (SPS), also referred to as intervals, is preprogrammed into microcontroller 102 for calibration and resolved as $T_{INT}$.
   iii. Number of Starting Black Sample Intervals ($IMUBS_{START}$), are predetermined as previously discussed herein.
   iv. Number of Non-Black Sample Intervals (IMUnBS), are predetermined as previously discussed herein.

B. Calculated data from the analysis includes:
   i. Total Sample Intervals ($S_{TOT}$), is determined from the IMU 150 calibration data file as the total number of intervals clocked from the response to remote-control receiver pulse 602 to the response to remote-control receiver pulse 604.
   ii. Number of Stop Black-Sample Intervals ($IMUBS_{STOP}$), which is determined by subtracting the sum of $IMUBS_{START}$+IMUnBS from $S_{TOT}$.

Block 264 calls for the black frame and non-black-frame analysis of the VRD 10 video file. There are several well-known and widely available programs which can be used for this purpose. For example, FFmpeg is a program designed for command-line-based processing of video and audio files that can analyze a video file to determine highly contrasted black frames with non-black frames. The user also can select the threshold for determining the level of contrast which distinguishes between the two. (FFmpeg is part of a free software project published under the GNU Lesser General Public License 2.1+ or GNU General Public License 2+, depending on which options are enabled.) An additional non-limiting embodiment is therefore the ability of the calibration user to set the black verses non-black threshold if a completely dark environment is not available for calibration. The following predetermined known data and calculated video file data include:

A. Predetermined known data includes:
   Frame Frames-Per-Second (fps), which the user can actually set on most VRD's.
B. Calculated data from the analysis includes:
   i. Total Frames ($F_{TOT}$), which is easily determined using FFmpeg or a similar program.
   ii. Number of Starting Black Frames ($VBF_{START}$).
   iii. Number of Non-Black Frames (VnBF).
   iv. Number of Stop Black Frames ($VBF_{STOP}$).

Block 266 details the basic method for calculating an applied offset by performing a ratiometric or proportional calculation of the non-black sample intervals against the non-black frames, in order to calculate the interval timing offset ($T_{OFFSET}$) which must be applied to the IMU 150 in order for the data sample rate to either directly or proportionately synchronize with the video fps rate. Calculating $T_{OFFSET}$ can be done in terms of time or clock cycles, as previously mentioned. The formulas and examples are provided below:

When the SPS of the IMU 150 and the FPS of the VRD 10 are equal (e.g., 240 sps/240 fps):

$$T_{OFFSET} = \left(\frac{IMUnBS \times T_{INT}}{VnBF}\right) - T_{INT}$$

Example

SPS=240; FPS=240; IMUnBS=2400; VnBF=2382
$T_{INT}$=4.16667 ms or 16667 clock cycles using a 4.00 MHz clock on the interrupt counter-timer. Using a 4.00 MHz clock, the examples below are rounded to the nearest 250 ns.
Solving for time (ms):

$$T_{OFFSET} = \left(\frac{2400 \times 4.16667}{2382}\right) - 4.16667 = 0.31486 \text{ ms} \approx 31.5 \text{ μs}$$

Therefore, 31.5 μs would be added to the IMU 150 $T_{INT}$ for a new $T_{INT}$=4.19817 ms
Solving for clock cycles:

$$T_{OFFSET} = \left(\frac{2400 \times 16667}{2382}\right) - 16667 \approx 126$$

Therefore, 126 clock cycles would be added to $T_{INT}$ for an adjusted $T_{INT}$=16793

When the SPS of the IMU 150 and the FPS of the VRD 10 are not equal (e.g., 1000 sps/240 fps)

$$T_{OFFSET} = \left(\frac{IMUnBS \times T_{INT}}{VnBF \times R}\right) - T_{INT}$$

Example

SPS=1000; FPS=240; IMUnBS=10000; VnBF=2365 R=1000/240
$T_{INT}$=1.000 ms or 4000 clock cycles (using a 4.00 MHz clock on the interrupt counter-timer)
Solving for time (ms):

$$T_{OFFSET} = \left(\frac{10000 \times 1.000}{2365 \times (1000 \div 240)}\right) - 1.000 = 0.014163 \text{ ms} \approx 14.25 \text{ μs}$$

Therefore, 14.25 μs would be added to $T_{INT}$ for a new $T_{INT}$=1.01425 ms
Solving for clock cycles:

$$T_{OFFSET} = \left(\frac{10000 \times 4000}{2365 \times (1000 \div 240)}\right) - 4000 \approx 59$$

Therefore, 59 clock cycles would be added to $T_{INT}$ for an adjusted $T_{INT}$=4059

Based on the calculations above, the calibration offset in clock cycles is applied to the IMU 150 (Block 268 of FIG. 4). The VRD 10 fps timing and the IMU 150 sps timing are now synchronized so that subsequent VRD 10 recorded video and IMU 150 collected data will be synchronized accordingly when a start command is initiated by remote control 160.

Those knowledgeable in Java and other programming languages will recognize that the entirety of the above IMU and VRD analysis, including the processing of CSV data and the acquisition and use of programs such as FFmpeg, can easily be incorporated into a single executable file with simple input and output capabilities.

Conventional FPS rate terminology was used in the previous examples to simplify the variables, formulas, and results. In actuality, the most common SMPTE fps rates used by VRDs are actually 24, 29.97, 59.94, 119.88, and 239.76, generally known to laypersons as 24, 30, 60, 120, and 240 fps, respectively.

The example timing diagrams of FIG. 8 are identical to FIG. 7, except for the LED 22 ON and OFF sequence as shown by ON timing labels 514, 516, and 518, and OFF timing labels 515 and 517. Likewise, labels 502, 503, 504 and 505 in FIG. 8 are equivalent to the labels 602, 603, 604 and 605 of FIG. 7. It is to be understood that any combination of predetermined LED 22 ON and OFF states can be used for calibrating and synchronizing the IMU 150 interval timing with the VRD 10.

VIII. Synchronizing an Inertial Measurement Unit Data Collection Starting Data Collection Interval with a Video Recording Device Starting Frame Referring again to Blocks 262 and 264 in FIG. 4 and the timing diagram of FIG. 9, the IMU 150 and the VRD 10 data analysis is further used to specifically identify the start and stop latencies of the IMU 150 and the VRD 10 in view of the received remote control 160 transmissions as they are individually processed and then acted upon by the IMU 150 and the VRD 10. Remote control receiver pulse 702 of duration 703 is received by the IMU 150 and the VRD 10. Rising edge 706 indicates the IMU 150 beginning to record data intervals, which commences after start latency time delay 707, which in this example represents the latency response of the IMU 150 to the received pulse 702. Rising edges 720, 724, and 730, show the possible VRD 10 responses to remote control receiver pulse 702. The VRD 10 rising edge 720 occurs simultaneously with the IMU 150 rising edge 706. The VRD 10 rising edge 724 occurs prior to the IMU 150 rising edge 706, herein defined as "start lead latency duration time" 728. The VRD 10 rising edge 730 occurs after the IMU 150 rising edge 706, herein defined as "start lag latency duration time" 736. In this calibration example, the IMU 150 LED 22 (rising edge 712) is turned ON after delay duration 710, turning OFF after a predetermined number of intervals (falling edge 716). The previous black and non-black frame analysis of the IMU 150 calibration data file and the VRD 10 video file that was used to synchronize the IMU 150 interval timing with the VRD 10 recorded video frame timing can also be used to determine a mathematical offset which can be applied to synchronize the start of the IMU 150 motion data with the VRD 10 video frames, the formula for which will be discussed below.

FIG. 9 further shows remote control receiver pulse 704 of duration 705 stopping the calibration test, which also produces IMU 150 and VRD 10 latency delays that can also be used to calculate an offset for synchronizing the IMU 150 motion data with the corresponding VRD 10 video frames, establishing a "Stop Latency Offset." The IMU 150 stops recording data intervals when the remote control receiver pulse 704 results in the IMU 150 responding with falling edge 708, which occurs after stop latency time delay 711. Falling edges 722, 726, and 734 show the possible VRD 10 responses to the remote control receiver pulse 704. The VRD 10 falling edge 722 occurs simultaneously with the IMU 150 falling edge 708. The VRD 10 falling edge 726 occurs prior to the IMU 150 falling edge 708, herein defined as "stop lead latency duration time" 732. VRD 10's falling edge 734 occurs after the IMU 150's falling edge 708, herein defined as "stop lag latency duration time" 738.

The file start synchronization objective is to calculate the required latency offset [$L_{OFFSET}$] for each condition below in order to adjust the IMU 150 start delay to the corresponding VDR 10 latency. The examples below are in view of the start latencies of the IMU 150 and VRD 10.

When the IMU 150 SPS and VDR 10 FPS are equal (e.g., 240 sps/240 fps)

$$L_{OFFSET}=T_{INT} \times (IMUBS_{START}-VBF_{START})$$

Example

SPS=240; FPS=240; $IMUBS_{START}$=480; $VBF_{START}$=462; $T_{INT}$=4.16667 ms or 16667 clock cycles (using a 4.00 mhz clock on the interrupt counter-timer)
Solving for time (ms):

$$L_{OFFSET}=4.16667\times(480-462)\approx 75 \text{ ms}$$

Therefore, 75 ms would be added onto the delay of the IMU to ensure that it starts collecting data at the same time as the VRD.

Solving for clock cycles:

$$L_{OFFSET}=16667\times(480-462)=300,006$$

Therefore, 300,006 clock cycles would be added onto the delay of the IMU to ensure that it starts collecting data at the same time as the VRD.

Note that with a positive $L_{OFFSET}$, the time value is added to the delay of the IMU 150 data collection, since the IMU 150 starts before the VRD 10. Likewise, if the value of $L_{OFFSET}$ was negative, the time of the delay would be reduced by the same amount to account for the event that the VRD 10 starts before the IMU 150.

When the IMU 150 SPS and VRD 10 FPS are not equal (ex: 1000 sps/240 fps)

$$L_{OFFSET}=T_{INT}\times(IMUBS_{START}-(R\times VBF_{START}))$$

Example

SPS=1000; FPS=240; $IMUBS_{START}$=2000; $VBF_{START}$=457; R=1000/240
$T_{INT}$=1.000 ms or 4000 clock cycles (using a 4.00 mhz clock on the interrupt counter-timer)
Solving for time (ms):

$$L_{OFFSET}=1.000\times(2000-((1000\div240)\times457))\approx 96 \text{ ms}$$

Therefore, 95 ms would be added onto the delay of the IMU 150 to ensure that it starts collecting data at the same time as the VRD 10.
Solving for clock cycles:

$$L_{OFFSET}4000\times(2000-((1000\div240)\times457))\approx 383,333$$

Therefore, 383,000 clock cycles would be added onto the delay of the IMU 150 to ensure that it starts collecting data at the same time as the VRD 10.

The formulas for determining stop latency offsets will be similar to the start latency offset formulas above, although the stop latency offset would be applied to the end of the IMU 150 motion data collection file and the VRD 10 video recording file, which, with a shift applied would, in turn, synchronize the starting data interval with its respective starting video frame. It can be seen from all of the equations presented herein that a single calibration test could be used to determine the interval timing offset ($T_{OFFSET}$), as well as the start latency offset ($L_{OFFSET}$). However, a more accurate method for determining a starting latency offset would be to run several shorter calibrations tests (e.g., 10 seconds per test), where the LED 22 of the IMU 150 was only illuminated for a very short time duration (e.g., 3 seconds), and where the user would be instructed to stop the tests after approximately 10 seconds. For example, assume that a single longer duration test is used in order to determine the interval timing offset, and that the interval timing offset is then programmed into the IMU 150, which synchronizes the IMU 150 interval timing with the VRD 10 video frame timing. Assume that five successive short duration calibration tests are then run, each being analyzed for start and stop latencies. A statistical analysis of all five tests is then performed to determine the standard deviations of the start latencies and the stop latencies. Assume, for example, that the whole number value of the start latency standard deviation is 4 and the stop latency standard deviation is 3. In this instance, the stop latency could be applied to provide the most accurate and repeatable synchronization between subsequent IMU 150 motion data collection intervals with VRD 10 video recording frames.

There are several simple methods for incorporating the latency offset between the IMU 150 and the VRD 10 for synchronizing subsequent IMU 150 motion data collection intervals with the VRD 10 video recorded frames of the object to which the VRD 10 is attached. The IMU 150 can be programmed to incorporate in the latency offset. For example, in the instance where the latency offset is positive, the IMU 150 would add the offset as a delay in clock cycles or intervals (i.e., rising edge 706 would be delayed by the addition of the latency offset). In the instance where the latency offset was negative, the IMU 150 motion data file could be modified at any time to add null data intervals prior to the interval corresponding to rising edge 706).

Once the IMU 150 interval timing is synchronized with the VRD 10 video frame timing, another start synchronization method is for the LED 22 on the IMU 150 to flash at precisely predetermined intervals for the duration of single or multiple intervals. This assumes that the LED 22 is within the field of view of the VRD 10. For instance, the LED 22 could flash once per second or once every "x" intervals when IMU begins collecting data. Although the LED 22 illumination in most video recording environments would not allow for black and non-black frame analysis due to the limited light contrast between the ON and OFF states of LED 22, the visibility of LED 22 in the recorded video frame would be sufficient for manually shifting the IMU 150 motion data intervals left or right with respect to the corresponding VRD 10 video frames in order to synchronize the IMU 150 motion data with the VRD 10 recorded video.

Figure 11:
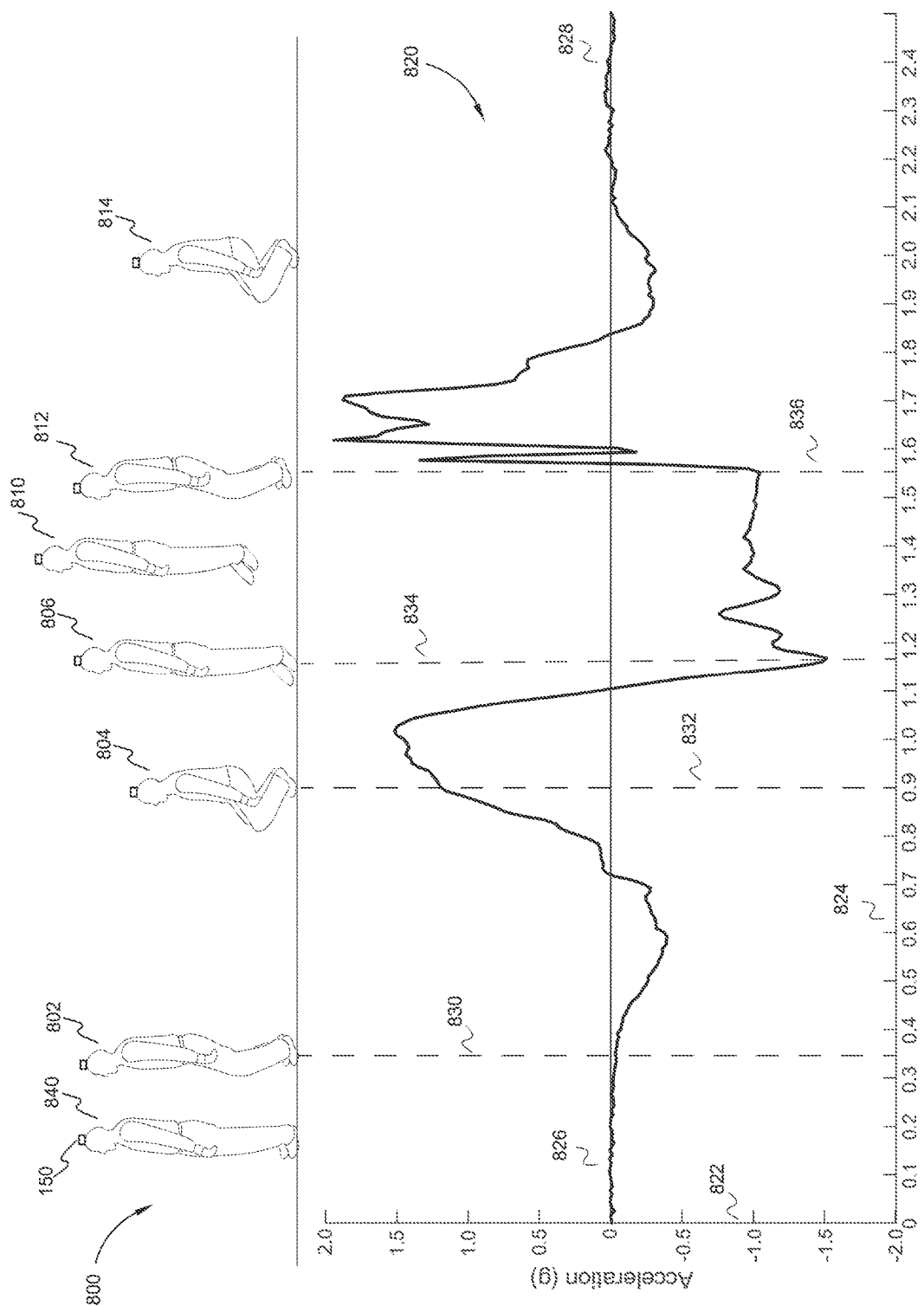
FIG. 11 shows an example illustration of specific isolated video frames captured by the video recording device synchronized with the corresponding graphed motion data stored by the inertial measurement unit of the exemplary motion data synchronization system.

IX. Simultaneous Display and Use of Motion Data Synchronized with a Video File When the interval timing offset and start latency offset have been applied to the IMU 150 and subsequent IMU 150 motion data collection is video recorded by the now synchronized VRD 10, the resulting synchronized files can be combined and viewed using several different methods. One method is to use ELAN, a Java-based program from the Max Planck Institute for Psycholinguistics, The Language Archive, Nijmegen, The Netherlands, which is a professional tool for the creation of complex annotations on video and audio resources. One of ELAN's capabilities is to simultaneously allow the display of one or more video files and one or more annotation documents which, for example, could be the graphically represented data as collected by the IMU 150. For example, FIG. 11 shows an example of a screen display of a single axis vertical acceleration graph 820 with a second screen, picture-in-picture, or overlaid individual video frame sequence 800, wherein the interval timing offset and start latency offsets were used with the IMU 150 and VRD 10 to synchronize the IMU 150 motion data intervals with the VRD 10 recorded video. Y-Axis 822 shows the acceleration in g's while the X-Axis 824 shows the time in tenths of a second. The IMU 150 is shown attached to the head of FIG. 840, where it will remain for the duration of the VRD 10 recorded video of the vertical jump. Standing still FIG. 840 directly corresponds to nearly straight line location 826 of the acceleration graph 820, shown shortly after the start command was sent from remote control 160. The sequence then progresses as follows:
  i. Vertical intercept 830 shows the acceleration graph 820 beginning to go negative as the FIG. 802 begins to move
  ii. Vertical intercept 832 shows the acceleration graph 820 sloping positive as the crouching FIG. 804 prepares to jump
  iii. Vertical intercept 834 shows the acceleration graph 820 sharply sloping downward as the upward-moving FIG. 806 is beginning to jump
  iv. Airborne FIG. 810
  v. Vertical intercept 836 shows acceleration graph 820 as free-falling FIG. 812 is about to hit the ground
  vi. Jump-recovering FIG. 814 is crouched after the jump

X. Embedding Motion Data into a Video File and Retrieving Motion Data from a Video File The discussion below provides an overview of how a video file can be paired with timecoded data and describes the process of embedding or retrieving IMU-generated motion data from a video file. The IMU-generated motion data referred to herein is motion data of an object collected by the IMU that is attached to the object which has had its motion captured by a video recording device, the motion being captured in the video frames of the video file. That is, the motion data embedded into the video file is not just any motion data, but is specifically motion data of an object collected by the IMU that is attached to the object, and that has also been simultaneously video-recorded during collection of the motion data.

IMU data can be directly embedded into virtually any video filetype format (using codecs) within the subtitle (or other codec parameter available for non-video data) or pre-processed mathematically (or otherwise) prior to being embedded and can be retrieved/extracted from the same video while playing. The extracted data can then be displayed graphically, displayed as a raw data feed, or processed (external to the codec) for some other purpose, such as to generate Euler angles. The processes described herein are automatically facilitated using a computer program, with little to no user interaction required.

The process of video embedding is fitted to, but is not limited by, the following current widespread boundaries of practices and protocol.
  i. MP4 and h.264 Codec
  The MP4 file and h.264 codec is the most widely used filetype and codec for videos, respectively, although subtitle and data embedding, as described herein, can also be similarly accomplished with other video filetypes and codecs.
  ii. Subtitle Parameter as a Means for Embedding Data
  There are many ways of embedding data into a video (e.g., metadata, steganography), all of which can be used in place of subtitles for this process.
  iii. 1.0 Millisecond Timing Interval for Subtitles
  In view of the example MP4 file format, the subtitles must be set to a whole number millisecond value, and therefore, cannot accurately represent the timing of most standard video frames. When all requisite data for a given video frame rate must be captured within the specific frames without overlap, a floor function must be used to estimate the timing. If a codec were to be designed to incorporate subtitle timing values more or less precise than those bounded by a "*.srt" file, a process could also be fitted to round to those different restrictions as well. A srt file is a subtitle file saved in the SubRip file format. It is supported by several video formats such as DivX and DVD and used by various video playback programs.
  iv. Frame Rates of the Camera
  Camera frame rates for this process will generally fall under those regulated by the SMPTE timecodes. However, the variability of the frame rate in the time code algorithm allows virtually any frame rate to be utilized. The most common SMPTE Timecodes are as follows:
    24 frame/sec (film, ATSC, 2k, 4k, 6k)
    25 frame/sec (PAL (Europe, Uruguay, Argentina, Australia), SECAM, DVB, ATSC)

29.97 (30±1.001) frame/sec (NTSC American System (US, Canada, Mexico, Colombia, etc.), ATSC, PAL-M (Brazil))

30 frame/sec (ATSC)

or any multiple of the above frame/sec (for example: 239.76 fps is a multiple of 29.97 fps)

Figure 5:
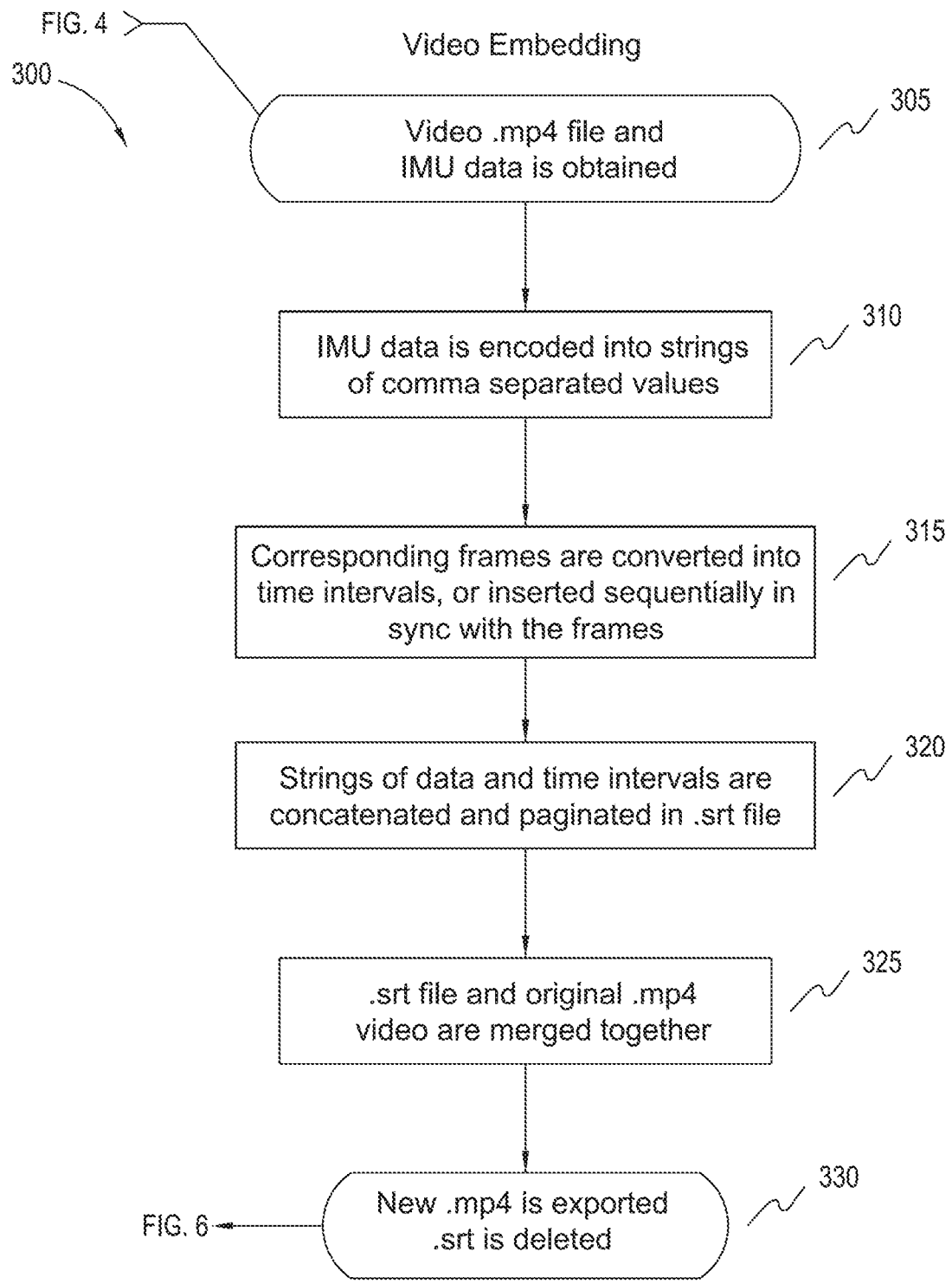
FIG. 5 shows an example method flowchart for embedding motion data within a video file of the exemplary motion data synchronization system.

FIG. 5 is a flowchart for the video embedding process 300 and includes the following steps:

Step 305:

A video .mp4 file and IMU data is obtained. As described above, MP4 is a multimedia format which can store and play audio, video, and subtitles using the AAC/mp3 and h.264 codecs, respectively. The format is one of the most common video file extensions and can be viewed and stored on almost any platform, including mobile phones, which is one the exemplary target platforms for use with the present invention. While an MP4 embodiment is described herein, other file formats such as *.m4a and *.mov files may be used.

Step 310:

The IMU data inserted into the video is next encoded into a string, separated by commas. Consider the following example which is data retrieved from the first data point of the sample vertical jump test shown in FIG. 11.

A module reading 16-bit unsigned data from an Accelerometer, Gyroscope, and Magnetometer with three axes each:

| Accel-X: 1168 | Magnet-X: 4662 | Gyroscope-X: 65403 |
| Accel-Y: 396  | Magnet-Y: 5164 | Gyroscope-Y: 5     |
| Accel-Z: 6148 | Magnet-Z: 6601 | Gyroscope-Z: 279   |

Combined and condensed into string format, as just one possible example, it would read: "1168, 396, 6148, 4662, 5164, 6601, 65403, 5, 279"

The data in this example is the raw unsigned data. However, the signed data can also be used if desired. If so, the csv file just needs to be adjusted accordingly.

The values for each of the readings can be obtained by splitting the string by "," and searching the assigned index of the desired value. Although the example of 9-DOF is used, the aforementioned process can be used for any number of axes and degrees of freedom by increasing the length of the output string and the number of values held by it. Also, data could be processed prior to string creation/conversion, if, for example, Euler angles or any other processed or derived information was desired to be included as part of the string.

Step 315:

Corresponding frames are converted into time intervals, or inserted sequentially in sync with the frames. The *.srt file into which the data is eventually inserted allows for time stamps with millisecond precision and no more: i.e., a time frame cannot be set to a duration of 2 seconds or 231.1 milliseconds. Therefore, given SMPTE timecodes with frame rates such as 24, 29.97, and 30 frames per second, millisecond precision is not sufficient as frames fall in between milliseconds.

To solve this problem, the timecodes for a given frame will be rounded with the following function:

$$t = \left\lfloor \frac{1000 f - 500}{r} \right\rfloor$$

Where:

t=time of the frame start in milliseconds f=frame number r=frame rate of the video/camera (frames per second)

Hence, given a frame rate and a frame number, the function can produce a precise rounding of the middle time point of the frame. Any frame rate above 1000 fps would mean that the function is not an injection and could result in inaccurate calculations and errors in the decryption of the timecodes. This would mean that different frame numbers would map to the same time code which should not be possible.

The brackets in the equations of this description which point inward at the bottom refer to a floor function, meaning that it would round down the value obtained to an integer. A simple example time calculation of the second frame of a video that is running at 240 frames per second is seen below; in this case, f=2 and r=240.

$$t = \left\lfloor \frac{1000(2) - 500}{240} \right\rfloor = \lfloor 6.25 \rfloor = 6 \text{ ms}$$

The second frame of the 240 fps video would thus correspond with the 6 millisecond mark.

Another time calculation to find the thousandth frame of a video running at 120 fps is shown below: f=1000 and r=120.

$$t = \left\lfloor \frac{1000(1000) - 500}{120} \right\rfloor = \lfloor 8329.1\overline{6} \rfloor = 8329 \text{ ms}$$

The thousandth frame would thus be correlated with the 8329 millisecond mark of the video.

To convert the time in milliseconds to the time that the subtitles require (hh:mm:ss,ms) from the time in milliseconds, the following functions will be used:

Milliseconds to Hours $$h = \left\lfloor \frac{t}{3600000} \right\rfloor$$

Where:

h=hours passed in t milliseconds t=time passed in milliseconds

Milliseconds to Minutes $$m = \left\lfloor \frac{t - 3600000 \ h}{60000} \right\rfloor$$

Where:

m=minutes passed in t milliseconds h=hours passed in t milliseconds t=time passed in milliseconds Milliseconds to Seconds $$s(t) = \left\lfloor \frac{t - 60000 \text{ m} - 3600000 \text{ h}}{1000} \right\rfloor$$

Where:
s=seconds passed in t milliseconds
m=minutes passed in t milliseconds
h=hours passed in t milliseconds
t=time passed in milliseconds
Milliseconds Remaining $$ms = t - 1000\ s - 60000\ m - 3600000\ h$$

Where:
ms=milliseconds remaining
s=seconds passed in t milliseconds
m=minutes passed in t milliseconds
h=hours passed in t milliseconds
t=time passed in milliseconds
The outputs of these functions can be concatenated to form the suitable .srt timestamp format: "h(t): m(t): s(t), ms(t)."
Two examples of turning a time in milliseconds to a format suitable for subtitle files can be seen below.
With 20,039 milliseconds:

$$h = \left\lfloor \frac{20039}{3600000} \right\rfloor \approx \lfloor 0.005566 \rfloor = 0 \text{ hours}$$

$$m = \left\lfloor \frac{20039 - 3600000(0)}{60000} \right\rfloor \approx \lfloor 0.334 \rfloor = 0 \text{ minutes}$$

$$s(t) = \left\lfloor \frac{20039 - 60000(0) - 3600000(0)}{1000} \right\rfloor \approx \lfloor 20.039 \rfloor = 20 \text{ seconds}$$

$$ms = 20039 - 1000(20) - 60000(0) - 3600000(0) = 39 \text{ milliseconds}$$

Thus the time code would be in the format,
00: 00: 20: 039
With 8,371,892 milliseconds:

$$h = \left\lfloor \frac{8371892}{3600000} \right\rfloor \approx \lfloor 2.3255 \rfloor = 2 \text{ hours}$$

$$m = \left\lfloor \frac{8371892 - 3600000(2)}{60000} \right\rfloor \approx \lfloor 19.5315 \rfloor = 19 \text{ minutes}$$

$$s(t) = \left\lfloor \frac{8371892 - 60000(19) - 3600000(2)}{1000} \right\rfloor \approx \lfloor 31.892 \rfloor = 31 \text{ seconds}$$

$$ms = 8371892 - 1000(31) - 60000(19) - 3600000(2) = 892 \text{ milliseconds}$$

Thus the time code would be in the format,
02: 19:31: 892

Step 320:

An .srt file is a SubRip Subtitle file, which holds video subtitle information, and can be contained in a .mp4 file. The strings used in subtitles are indexed and paginated in the following format.
i. Index of Subtitle (Starting with 1)
ii. Time Interval (hh:mm:ss,ms→hh:mm:ss,ms)
iii. Subtitle Text
iv. One Blank Line Below is an example of a subtitle properly formatted:
1
00:00:01,000→00:00:03,000
Sample Text In the above example, '1' is the index of the subtitle, the subtitle occurs from the first second to the third second of the video, and the text of the subtitle is "Sample Text". Thus, each parsed data string can be paired with its corresponding time interval (frame) in the subtitle file.

Step 325:

The .srt file is appended to the .mp4 file through a muxer, or multiplexer. This process can be done through software such as "WinX HD Video Converter Deluxe" (commercially available from Digiarty Software, Inc.) or libraries such as FFmpeg, which can be set up by downloading, and setting it as a system path variable. With FFmpeg, the entire process can be done programmatically through command line calls:
 ffmpeg   -i{video.mp4}   -ivideo.srt   -c   copy   -c:smov_text{outfile.mp4}

In the above code, "{video.mp4}" would be replaced with the name of the desired video and subtitle name to mux together, and "{outfile.mp4}" would be replaced with the desired name for the output mp4 file. The multiplexer takes two data streams—in this case the subtitle and video stream—and combines them into one output stream, which is the desired mp4 file with subtitles.

Step 330:

The completed mp4 file with the 9-DOF data in its subtitles is exported. The .srt file with the data is now redundant, so it is deleted.

Figure 6:
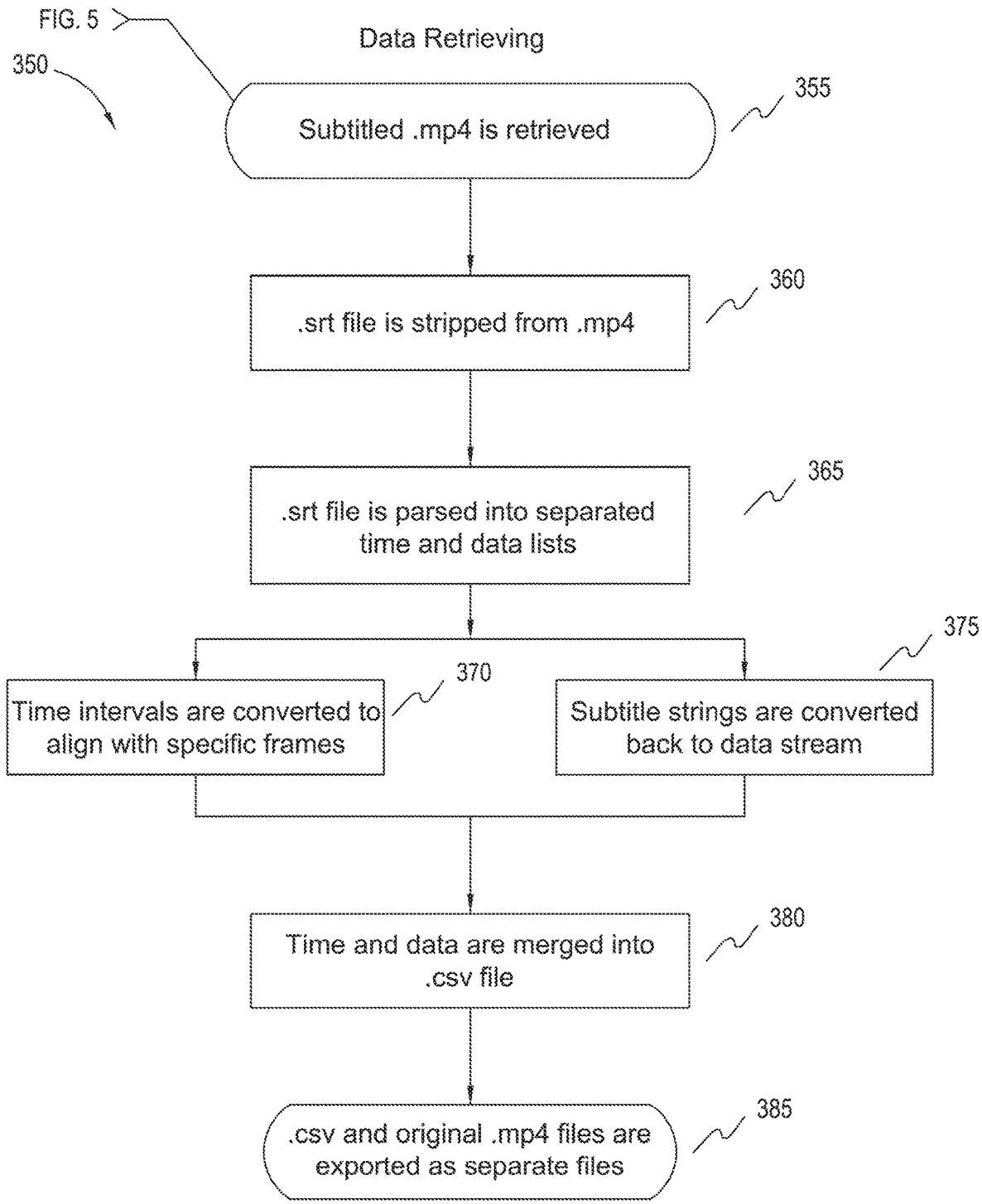
FIG. 6 shows an example method flowchart for extracting motion data from a previously embedded video file of the exemplary motion data synchronization system.

FIG. 6 is a flowchart for the data retrieving process 350 and includes the following steps:

Step 355:

A subtitled .mp4 file is retrieved. As mentioned previously, mp4 files can store audio, video and subtitle information. The file currently stores the data that was initially embedded, along with the audio and video of its visuals.

Step 360:

The .srt file is extracted (stripped) from the .mp4 file using a video demuxer, or de-multiplexer. FFmpeg can also be used to execute this method by running the following command line code.
 ffmpeg -i{Movie.mp4} -map 0:s:0 {subtitle.srt}

In the above code, FFmpeg takes an input file "{Movie.mp4}" (renamed to desired mp4) and uses the map function to map the subtitle stream of the .mp4 (denoted by "0:s:0") to the output file ("{subtitle.srt}").

Figure 13:
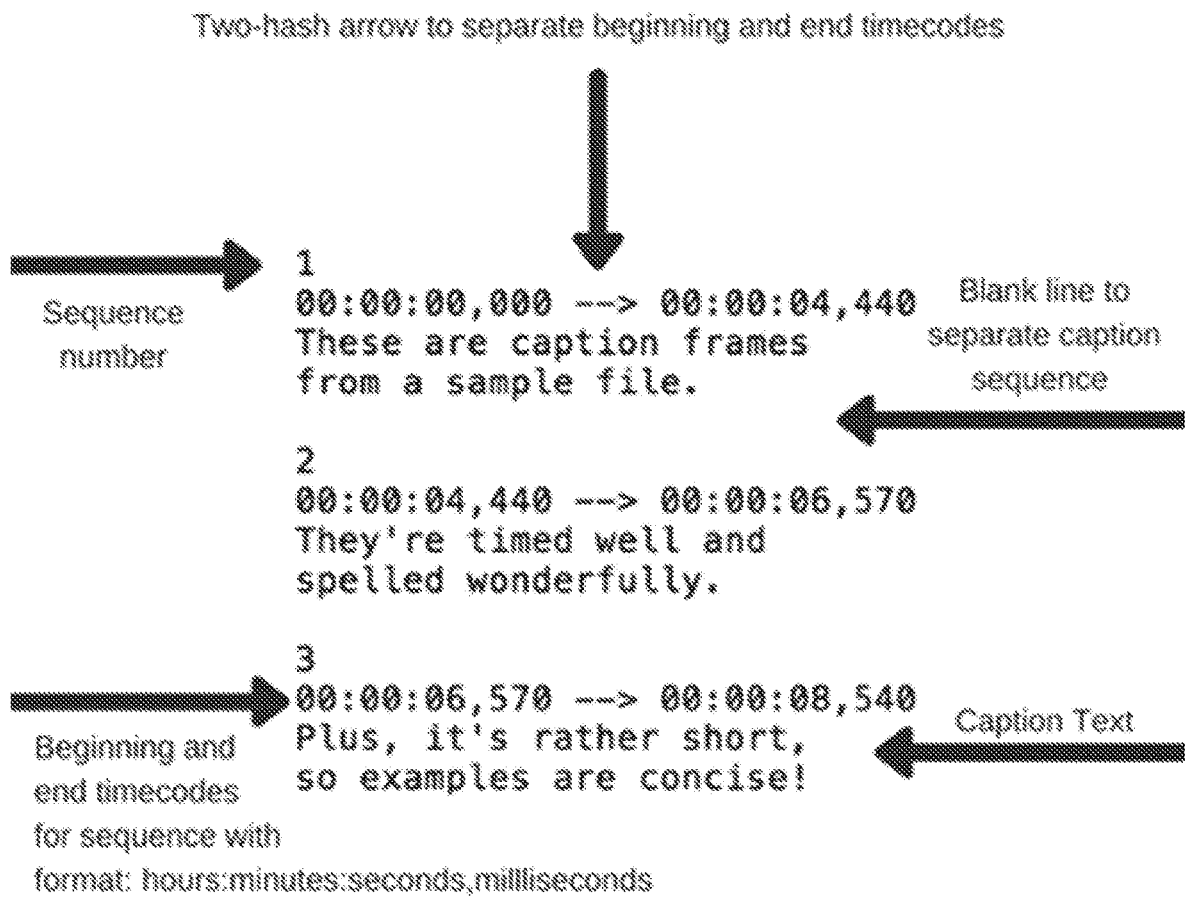
FIG. 13 is a prior art framework for creating a SubRip Subtitle" file.

Step 365:

From the file, each paginated subtitle is associated with a time code and string subtitle in a format like such as shown in FIG. 13. In this manner, the file can be parsed to separate the text into streams of times (time code) and data values, which are the strings of the subtitles.

Step 370:

The time code format is now converted back to the original time interval format so as to be properly aligned with the specific video frames. To obtain a time value in milliseconds back from the hh:mm:ss,ms format in the .srt, the following equation can be used:

$$t = ms + 1000\ s + 60000\ m + 3600000\ h$$

Where:
t=time passed in milliseconds
ms=milliseconds remaining
s=seconds passed in t milliseconds
m=minutes passed in t milliseconds
h=hours passed in t milliseconds Two examples of calculating time in milliseconds from the subtitle format are seen below. With 00:00:20:039:

$$t = 39 + 1000(20) + 60000(0) + 3600000(0) = 20039 \text{ milliseconds}$$

With 02:19:31:892:

$$t = 892 + 1000(31) + 60000(19) + 3600000(2)$$

The frame number can then be found with the following formula.

$$f = \left\lceil \frac{rt}{1000} \right\rceil$$

Where:
f=frame number corresponding to time
r=camera's frame rate in frames per second
t=time in milliseconds of the data
Below are two examples reverting the time calculated in the embedding examples back to a certain frame:
For a video running at 240 fps the frame corresponding with the $6^{th}$ millisecond of the video would be:

$$f = \left\lceil \frac{240 * 6}{1000} \right\rceil = \lceil 1.44 \rceil = 2$$

The brackets in the equations of this description that point inward at the top refer to a ceiling function, meaning that it would round up the obtained value to an integer.
For a video running at 120 fps the frame corresponding with the $8329^{th}$ millisecond of the video would be:

$$f = \left\lceil \frac{120 * 8329}{1000} \right\rceil = \lceil 999.48 \rceil = 1000$$

Step 375:
The subtitle strings are then parsed from their compressed state back into their specific 9-DOF values. As the string is split, each of the unique string entries has a corresponding data value.

For example, the string subtitle: "1168, 396, 6148, 4662, 5164, 6601, 65403, 5, 279" could be split programmatically into the string array:
["1168", "396", "6148", "4662", "5164", "6601", "65403", "5", "279"]
And then into the desired data:

| | | |
|---|---|---|
| Accel-X: 1168 | Magnet-X: 4662 | Gyroscope-X: 65403 |
| Accel-Y: 396 | Magnet-Y: 5164 | Gyroscope-Y: 5 |
| Accel-Z: 6148 | Magnet-Z: 6601 | Gyroscope-Z: 279 |

Step 380:
Now that the time frames are all calculated and connected to each corresponding string with data, the two can be combined into a .csv file.
Step 385:
With a completed .csv file extracted from the video, both files can be exported as separate files.
One of the main applications in which the subtitle embedding and decoding process can be used is with the visualization of 9-DOF data which is taken synchronously with a camera video. The process is laid out as follows:

When a test is run in a way so that it outputs a video file as well as a data file, and each frame in the video is synchronized with data taken from a sample, both the video as well as the sample data can be compiled into one .mp4 file. Using the process outlined above, a program can be executed to add the data into the subtitles of the .mp4 file. The outputted video can be played with a media player, such as VLC, commercially available from VideoLAN, where an add-on can be used to analyze data in the subtitles, using the video decoding process. Each analyzed sample can be graphed, and a dynamic graph showing the data can be played alongside the video. The result is a data graph which shows live data which represents the measurements taken at the exact moment in the video. This data graph has a multitude of uses in the professional world, from motion capture to position analysis.

XI. Additional Considerations

1. Module LED (LED 22 of the IMU 150)
Referring to the timing diagrams in FIGS. 7-9, the module LED is shown as having an ON and OFF state. In one embodiment, the ON state is a continuous ON state. In another embodiment, the ON state is a pulsed ON/OFF at a predefined frequency that is sufficiently high so as to achieve the effect of a continuous ON state.

2. IMU Motion Data File
FIG. 12 shows a sample IMU motion data file that is suitable for use in the present invention. The comma separated data in block 900 match up to the data fields in the first line labeled "INT."

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:
1. A method for reading out contents of a video file having a predefined video file format, the contents including (i) video frames of an object in motion captured by a video recording device, and (ii) motion data of an object collected by an inertial measurement unit (IMU) that is attached to the object and which is collected while capturing the video frames of the object in motion, the motion data being stored as metadata in one or more time intervals of the video file, the method comprising:
  (a) storing in a computer memory parsing instructions which indicate how the metadata is parsed into motion data for one or more previously captured video frames that are associated with the respective motion data; and
  (b) reading out the contents of the video file using the stored parsing instructions, thereby identifying specific previously captured video frames with their respective correlated motion data.

* * * * *